USO10607121B2

(12) United States Patent
Takimoto

(10) Patent No.: US 10,607,121 B2
(45) Date of Patent: Mar. 31, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Masafumi Takimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 15/785,187

(22) Filed: Oct. 16, 2017

(65) Prior Publication Data
US 2018/0121765 A1    May 3, 2018

(30) Foreign Application Priority Data
Nov. 2, 2016 (JP) ................. 2016-215470

(51) Int. Cl.
G06K 9/62      (2006.01)
G06K 9/46      (2006.01)
G06K 9/36      (2006.01)

(52) U.S. Cl.
CPC ......... *G06K 9/6276* (2013.01); *G06K 9/6228* (2013.01); *G06K 9/6231* (2013.01); *G06K 9/6234* (2013.01); *G06K 9/6248* (2013.01); *G06K 9/6254* (2013.01); *G06K 9/6265* (2013.01)

(58) Field of Classification Search
USPC .......................... 382/56, 159, 225, 201, 232
See application file for complete search history.

(56) References Cited

U.S. PATENT DOCUMENTS

| | | | |
|---|---|---|---|
| 9,036,860 B2* | 5/2015 | Chen ........................ | H04N 1/60 345/581 |
| 2004/0076313 A1* | 4/2004 | Bronstein .......... | G06K 9/00214 382/118 |
| 2008/0199075 A1* | 8/2008 | Gokturk ............... | G06K 9/6251 382/173 |
| 2010/0329556 A1* | 12/2010 | Mitarai ..................... | G06K 9/38 382/170 |
| 2012/0062732 A1* | 3/2012 | Marman .................. | H04N 7/18 348/142 |
| 2013/0183022 A1* | 7/2013 | Suzuki ............... | G06K 9/00718 386/241 |

(Continued)

OTHER PUBLICATIONS

Wu et al, "A SOM-Based Dimensionality Reduction Method for KNN Classifiers", IEEE 2010 International Conference of System Science and Engineering, pp. 1-6. (Year: 2010).*

(Continued)

*Primary Examiner* — Kathleen Y Dulaney
(74) *Attorney, Agent, or Firm* — Canon U.S.A., Inc. IP Division

(57) ABSTRACT

Before dimension reduction is performed while local data distribution is stored as neighborhood data, a distance between data to be subjected to the dimension reduction is calculated, and a parameter (a neighborhood number of the k-nearest neighbor algorithm or a size of a hypersphere) which determines the neighborhood data is determined for each data to be subjected to the dimension reduction. Thereafter, the dimension reduction is performed on the target data based on the determined parameter.

17 Claims, 24 Drawing Sheets

(56) References Cited

U.S. PATENT DOCUMENTS

| | | | |
|---|---|---|---|
| 2014/0092223 A1* | 4/2014 | Lin | G02B 27/2214 |
| | | | 348/54 |
| 2014/0139529 A1* | 5/2014 | Mukai | G06F 17/17 |
| | | | 345/442 |
| 2016/0071281 A1* | 3/2016 | Cordara | G06K 9/342 |
| | | | 382/154 |
| 2016/0127405 A1* | 5/2016 | Kasahara | H04L 63/1425 |
| | | | 726/23 |
| 2016/0267339 A1* | 9/2016 | Nakano | G06K 9/00295 |

OTHER PUBLICATIONS

Friedman, J. H., J. A. S. A., ; "Exploratory Projection Pursuit;" 1987 American Statistical Association, Journal of the American Statistical Association; Mar. 1987, vol. 82, No. 397; pp. 249-266.

Xiaofei He, Partha Niyogi; "Locality Preserving Projections;" Advances in Neural Information Processing Systems 16 (NIPS), Vancouver, Canada, 2003; pp. 1-8.

T. Hastie and R. Tibshirani; "Discriminant Adaptive Nearest Neighbor Classification;" IEEE Transactions on Pattern Analysis and Machine Intelligence, vol. 18, No. 6; pp. 607-616, Jun. 1996.

Joshua B. Tenenbaum, Vin de Silva, John C. Langford; "Global Geometric Framework for Nonlinear Dimensionality Reduction;" Science, vol. 290, No. 5500, Dec. 22, 2000, pp. 2319-2323.

Thomas H. Cormen, Charles E. Leiserson, Ronald L. Rivest and Clifford Stein; "Introduction to Algorithms;" (third edition), 2009 Massachusetts Institute of Technology; pp. 1-1313.

E W. Dijkstra; "A Note on Two Problems in Connexion with Graphs;" In Numerische Mathematik, 1, pp. 269-271, 1959.

\* cited by examiner

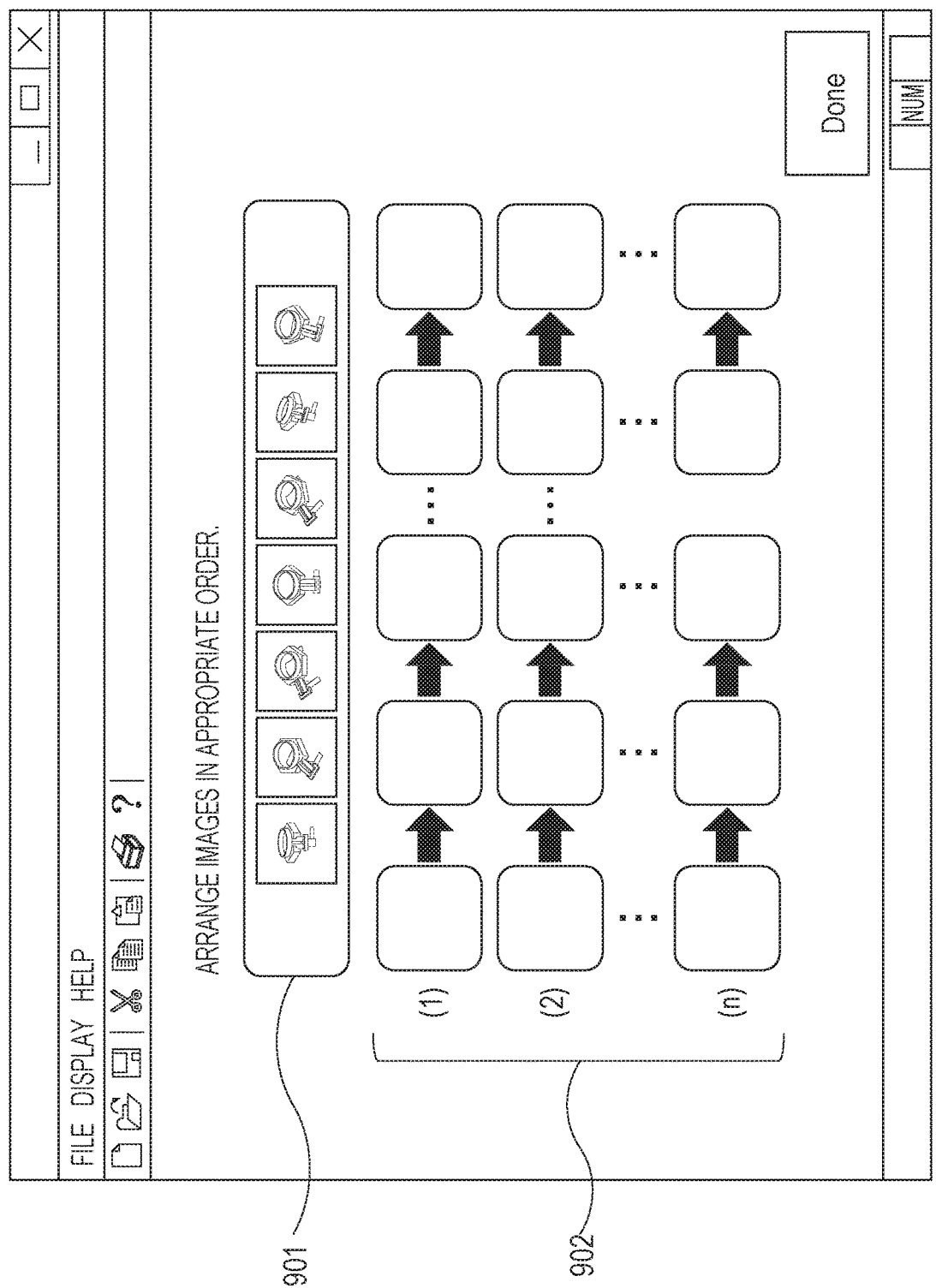

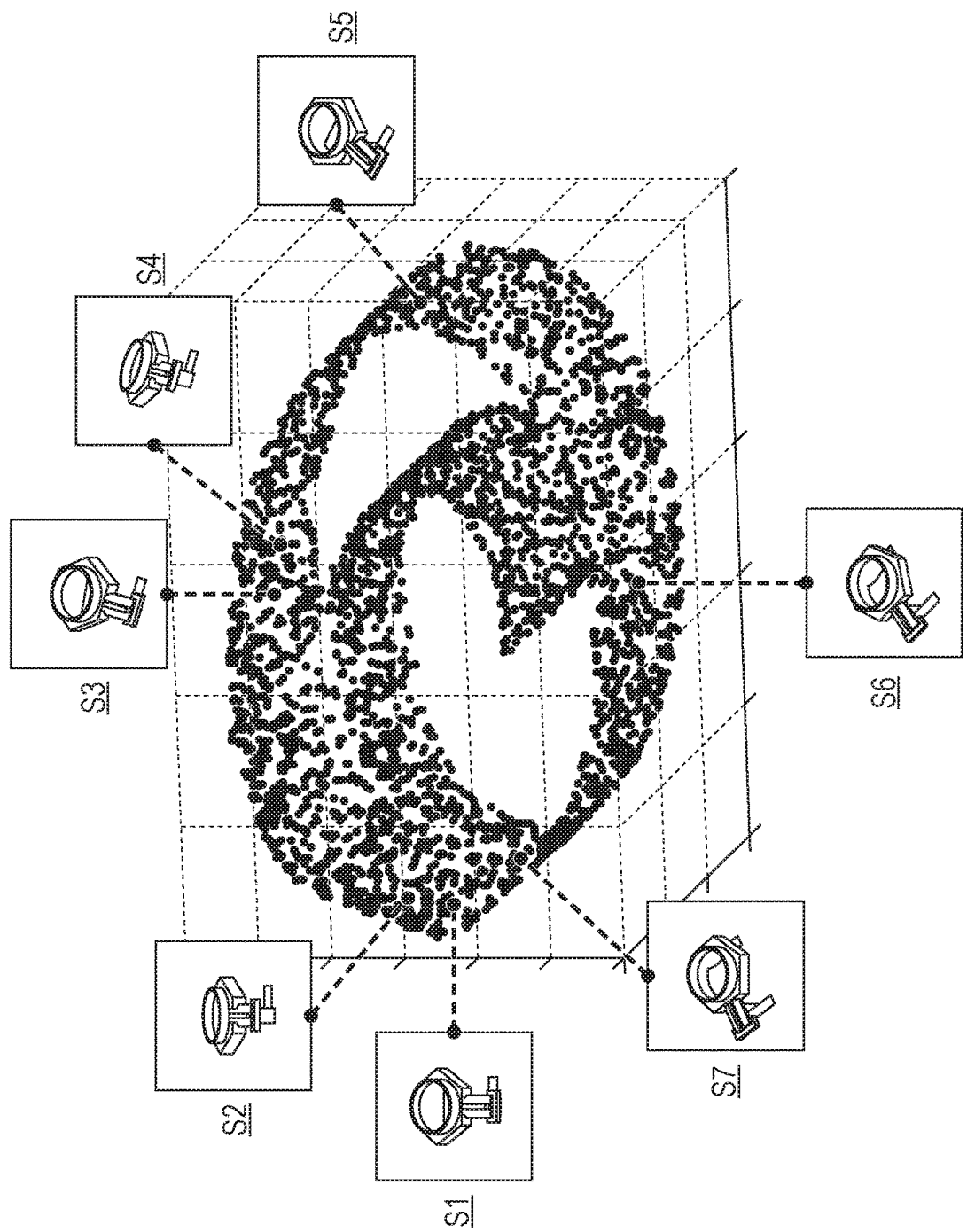

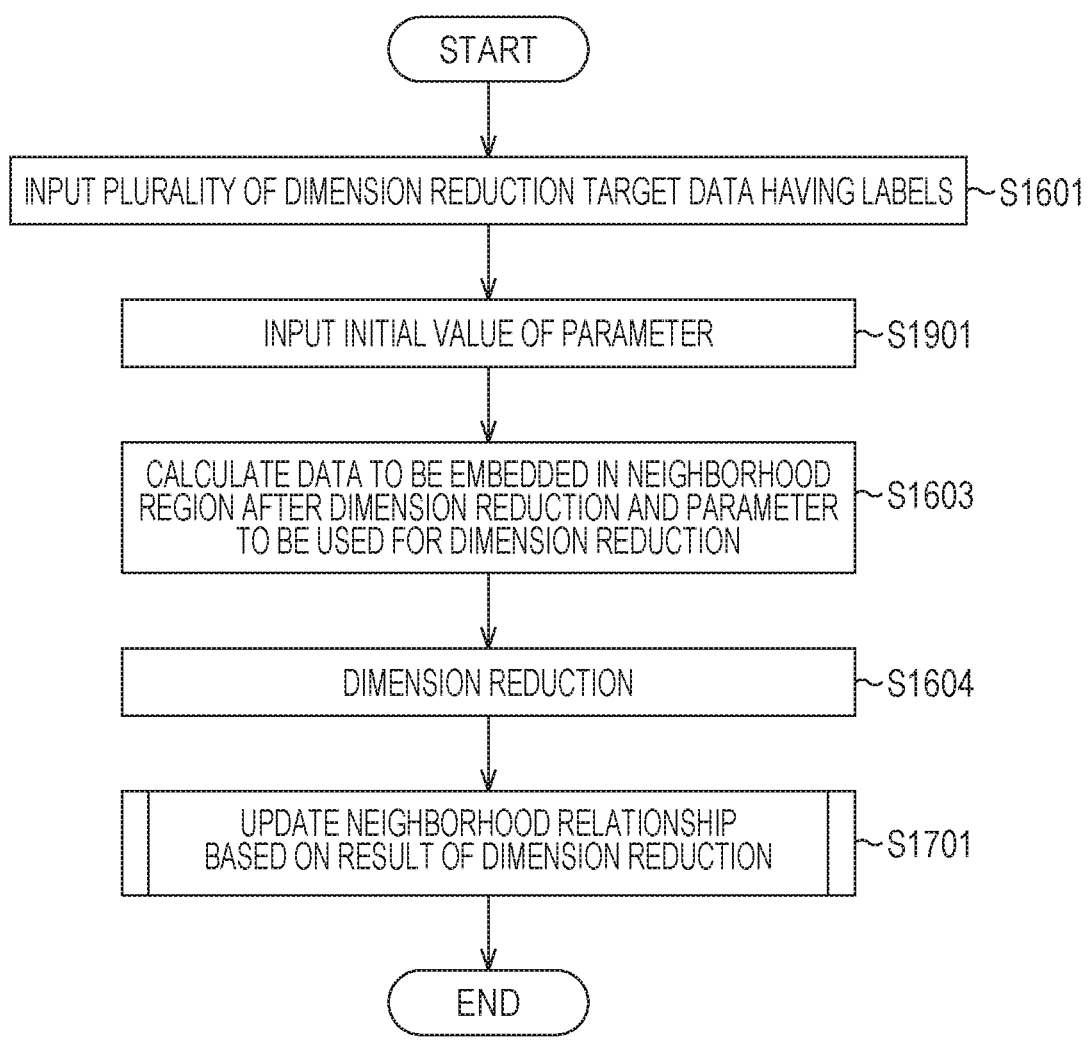

INFORMATION PROCESSING APPARATUS, INFORMATION PROCESSING METHOD, AND STORAGE MEDIUM

BACKGROUND OF THE INVENTION

Field of the Invention

The present disclosure particularly relates to an information processing apparatus and an information processing method which are suitable for performing dimension reduction on information on input data, and a storage medium which stores a program.

Description of the Related Art

In general, in a recognition situation of data analysis and a determination as to whether newly-generated data obtained after a plurality of data have learnt has a property which belongs to the learnt data, when the number of dimensions of input data is large, a computing cost is increased, a learning issue exponentially becomes difficult. Therefore, it is important that a feature value of the input data is not used as it is, but the number of dimensions is reduced while intrinsic information is maintained. Furthermore, data of four dimensions or more may not simply recognized in a visual manner, and therefore, it is similarly important that the number of dimensions of original data is reduced to three dimensions or less when the data is visualized while trend of the original data is stored as much as possible.

Examples of general methods for dimension reduction include Fisher Discriminant Analysis (FDA).

In the FDA, dimension reduction is performed using linear projection calculated from a generalized eigenvalue issue which minimizes dispersion in a class and maximizes inter-class dispersion. Therefore, the FDA does not support dimension reduction of distributed data having multimodality in a class, that is, the FDA is not suitable for such dimension reduction. Furthermore, examples of a general unsupervised dimension reduction method which does not use labels include Principal Component Analysis (PCA). In this method, dimension reduction is performed using linear projection calculated from an eigenvalue issue associated with a covariance matrix of data. As another unsupervised dimension reduction method which does not use labels, Projection Pursuit (PP) disclosed in Friedman, J. H. Exploratory projection pursuit. J. A. S. A., 82, 249-266 has been used. The PP is a method for performing dimension reduction such that a comparatively interesting structure is stored based on an index indicating "interestingness" of a data structure. Although the index in this case is referred to as "Projection Index", the dimension reduction is basically performed such that a most non-Gaussian direction in data is found, and therefore, the index serves as a reference for measurement of a non-Gaussian property. However, this method globally determines a feature axis which is also important in the PCA and the PP, and therefore, dimension reduction which reflects a local distribution state may not be performed.

Therefore, a number of methods for performing dimension reduction while local data distribution (hereinafter referred to as "neighborhood data") is stored as much as possible have been proposed. In the methods, as a method for obtaining a result of dimension reduction as a method for performing unsupervised linear dimension reduction, Locality Preserving Projections (LPP) is disclosed in Locality Preserving Projections, Xiaofei He, Partha Niyogi, Advances in Neural Information Processing Systems 16 (NIPS), Vancouver, Canada, 2003. In the LPP, locality of data in a feature space is focused and dimension reduction is performed while the local distance relationships between data items located close to each other in the feature space are maintained as much as possible so that the data items are also located close to each other in the feature space after the dimension reduction. According to this method, the neighborhood relationships between the data items are determined in accordance to a determination as to whether one of the data items is located within a neighborhood region of the other of the data items or a determination as to whether one of the data items is located in a hypersphere having arbitrary one of the data items at a center.

As an example of a supervised linear dimension reduction method taking the locality into consideration, Local Discriminant Information (LDI) disclosed in T. Hastie and R. Tibshirani, Discriminant adaptive nearest neighbor classification, IEEE Transactions on Pattern Analysis and Machine Intelligence, 18(6):607-615, 1996a, dimensionality reduction, In Proceedings of the 23th International Conference on Machine Learning, pages 905-912, 2006 is used. Also in this method, dimension reduction is performed such that data items in different classes are separated from each other with reference to labels while the local distance relationships between the data items are stored as much as possible by bringing one of the data items which are located close to each other to the other of the data items. As a method for performing unsupervised nonlinear dimension reduction, Isomap disclosed in Joshua B. Tenenbaum, Vin de Silva, John C. Langford, "Global Geometric Framework for Nonlinear Dimensionality Reduction", Science, vol. 290, no. 5500, Dec. 22, 2000, pp. 2319-2323 is used. Also in this method, as parameters determined in advance, a neighborhood number k and data included in a hypersphere having a size ε is determined as neighborhood data. For example, neighborhood data to be embedded in a neighborhood region is determined after the dimension reduction using data in accordance with the size ε of the hypersphere, and the dimension reduction is performed such that the relationship between the data is stored.

SUMMARY OF THE INVENTION

According to an embodiment of the disclosure, an information processing apparatus which performs dimension reduction while local data distribution is stored as neighborhood data includes a distance calculation unit configured to calculate a distance between data to be subjected to the dimension reduction, a determination unit configured to determine a parameter which determines the neighborhood data based on the distance calculated by the distance calculation unit for each data to be subjected to the dimension reduction, and a dimension reduction unit configured to perform dimension reduction on data to be subjected to the dimension reduction based on the parameter determined by the determination unit.

Further features of the disclosure will become apparent from the following description of exemplary embodiments with reference to the attached drawings.

BRIEF DESCRIPTION OF THE DRAWINGS

FIGS. 9A to 9C are diagrams illustrating screens which prompt a user to input the distance relationships between data.

FIG. 10 is a diagram illustrating the distance relationships between the data in distribution of Swiss Roll.

FIG. 20 is a flowchart of an example of a procedure of another process performed by the information processing apparatus according to the sixth embodiment.

DESCRIPTION OF THE EMBODIMENTS

First Embodiment

Hereinafter, a first embodiment of the disclosure will be described in detail with reference to the accompanying drawings. In this embodiment, a case where manifold learning is performed with unsupervised data will be described as an example. The term "manifold" means a graphic or a space which is locally seen to be a Euclidean space, and the term "manifold learning" means a method for extracting substantially low-dimensional information of a data structure embedded in a high-dimensional manifold.

Concrete examples of data to be subjected to dimension reduction in this embodiment include high-dimensional data obtained by extracting a plurality of features from an image obtained by capturing an object, such as a face or a body of a person, an animal, an internal organ, or a vehicle, a monitoring image in a town, or the like. The examples may further include data which is represented by a high-dimensional feature value by extracting a plurality of features from images obtained by capturing an object in a plurality of directions. The manifold learning is a versatile method which may be generally employed in a case where behavior and relevance of high-dimensional data are analyzed, and therefore, original data may not be particularly an image, and may be audio, other signals, or a feature of a combination of audio and a signal.

In this embodiment, in the general manifold learning systems (such as Isomap, Locally Linear Embedding, and Laplician Eigenmaps), the local neighborhood relationship obtained when nonlinear mapping is performed is more effectively reflected to a mapping result. Here, a method for setting the neighborhood relationship for each data will now be described. In the manifold learning systems listed above as the general techniques, the local neighborhood relationship is reflected to a mapping result in similar methods. Specifically, neighborhood data of each data is set by a neighborhood number k of the k-nearest neighbor algorithm or all data included in an inside of a hypersphere having arbitrary data (an arbitrary point a in a feature space) at a center is set as neighborhood data. Accordingly, this embodiment is applicable to any of the manifold learning systems described above. Note that the hypersphere having the arbitrary point a in the feature space at the center corresponds to a region within a distance (radius) ε from the arbitrary point a in the feature space when ε is a positive real number.

Figure 3A:
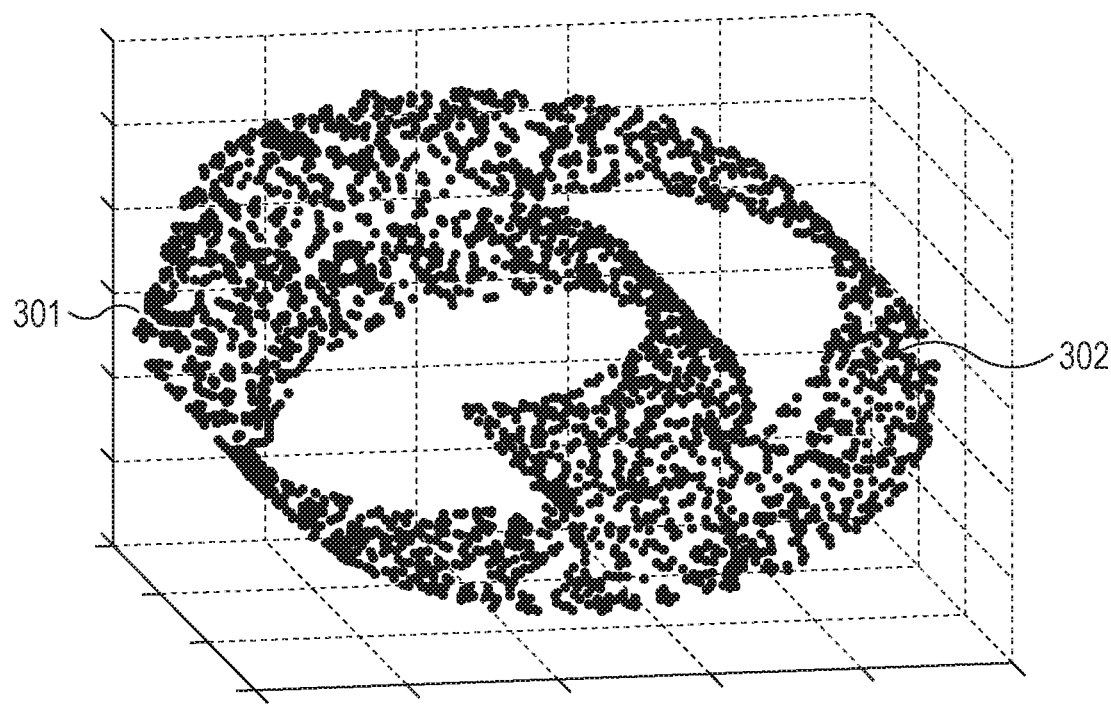
FIGS. 3A and 3B are diagrams illustrating distribution of Swiss Roll and a low-dimensional image of Swiss Roll, respectively.
Figure 3B:
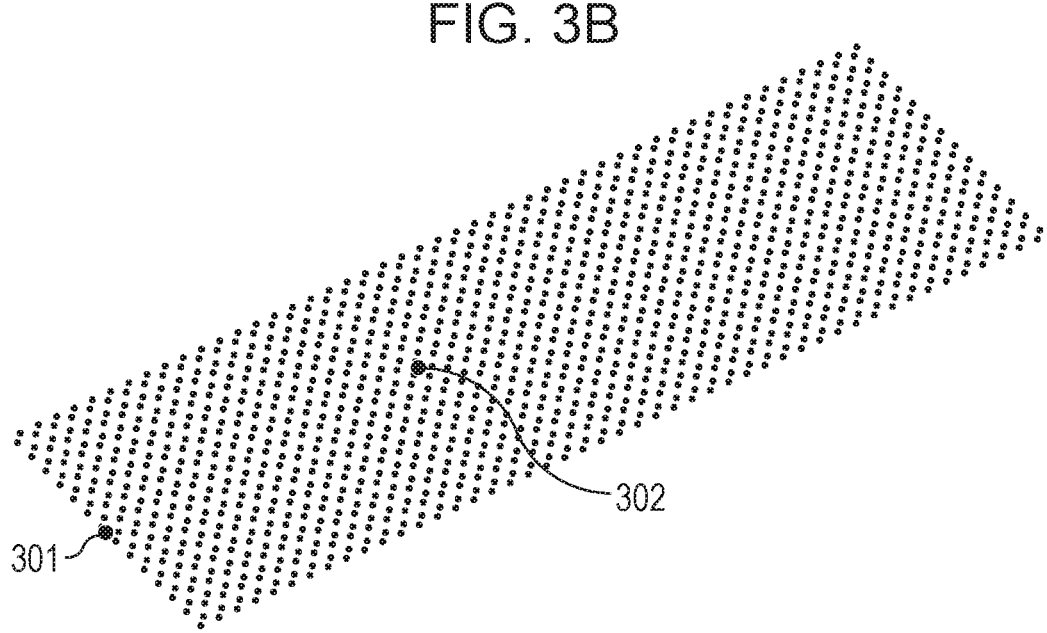

Hereinafter, an example of target data which attains the most excellent effect when this embodiment is employed is illustrated. FIG. 3A is a diagram illustrating distribution referred to as "Swiss Roll" indicating a state in which a plane including data is rolled in a high-dimensional space. Swiss Roll is generally used as an issue to be solved in manifold learning. In this example, actual data is included in a low-dimensional manifold in a high-dimensional space. FIG. 3B is a diagram illustrating a low-dimensional image obtained by extracting distribution of data which is virtually meaningful from the distribution illustrated in FIG. 3A. Note that, in the example of FIG. 3A, two-dimensional data having semantic spread is distributed in a three-dimensional space for simplicity. However, a feature space may not be a three-dimensional space, and data having information on three dimensions or less is distributed in an entire high-dimensional space.

Furthermore, Swiss Roll in FIG. 3A is an example of data distribution which may not obtain a preferred result of dimension reduction when a parameter k or ε which is used to control holding of local data distribution is fixed in an entire region. Specifically, data distributed in a Swiss Roll shape is expressed such that the data is distributed in high-dimensional curved planes for convenience sake. Here, in such a rolling state that intervals between the curved planes are maintained even from any region, virtually meaningful low-dimensional distribution may be extracted even if the parameter k or ε which is used to determine neighborhood data is fixed for all data. However, if the curved planes are separated from each other in some portions and are close to each other in other portions as illustrated in FIG. 3A, it is difficult to obtain a fixed parameter k or ε suitable for all data.

For example, in a case of data located in the vicinity of a region 302 in which a distance between the curved planes is large, it is difficult to aggregate the different curved planes even if the parameter which determines neighborhood data is set large. However, in a case where regions on different curved planes are located close to each other, that is, in a case of a region 301, for example, the curved planes may not be separated from each other if the parameter k or ε which determines a range of neighborhood data is fixed to a value which is appropriate for the region 302. Furthermore, if the parameter k or ε suitable for the region 301 is applied to all the data, neighboring curved planes are not aggregated, and therefore, the parameter k or ε becomes considerably small. In this case, as illustrated in distribution of FIG. 13A, data aggregations may be locally generated in portions in an isolated manner and a branch structure may be generated, and therefore, a distribution structure of data to be extracted may be buried in a distribution structure which is not important. Accordingly, in a case of the data distribution illustrated in FIG. 3A, it is difficult to obtain a preferred result of dimension reduction by the general methods.

Accordingly, in this embodiment, different parameters k or ε which determine the neighborhood relationship are set for different data. Hereinafter, a procedure of a determination of the parameters k or ε will be described.

Figure 1:
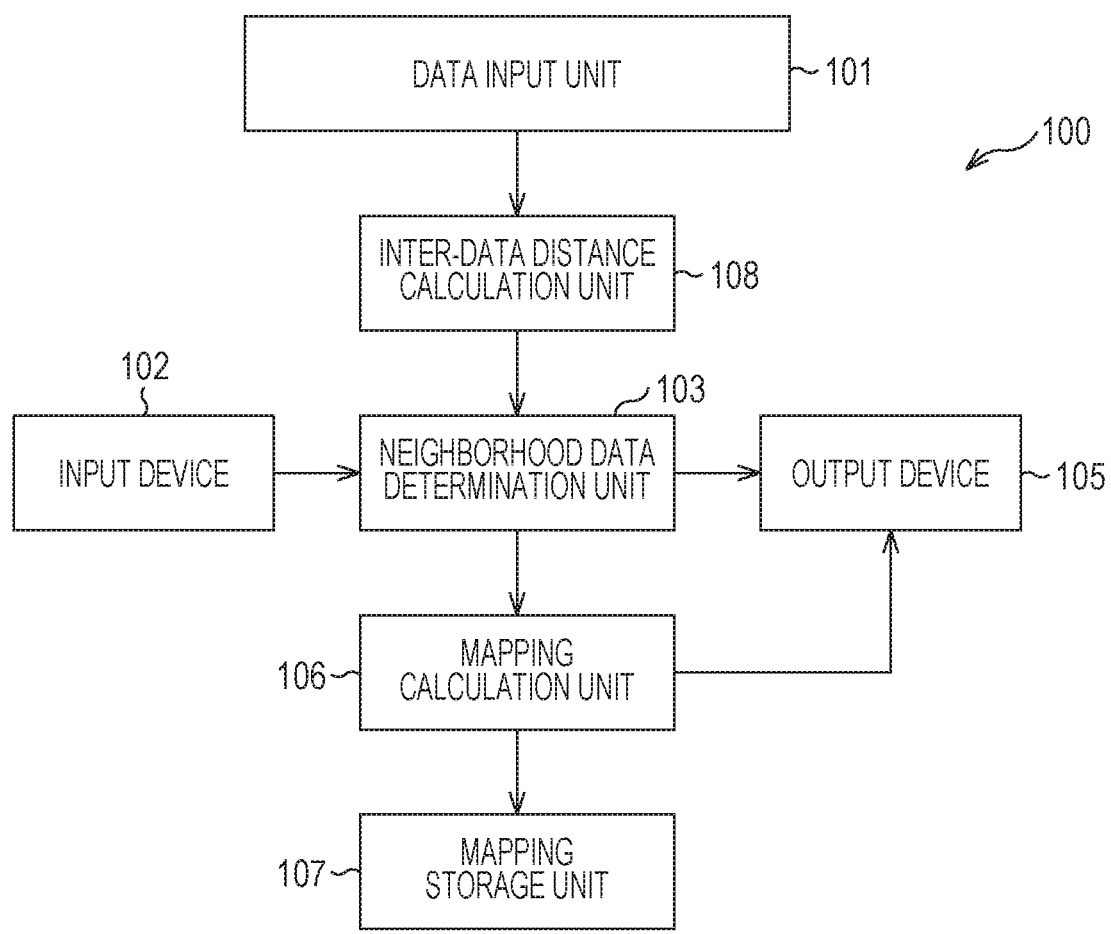
FIG. 1 is a block diagram illustrating a configuration of an image processing apparatus according to a first embodiment.
Figure 2:
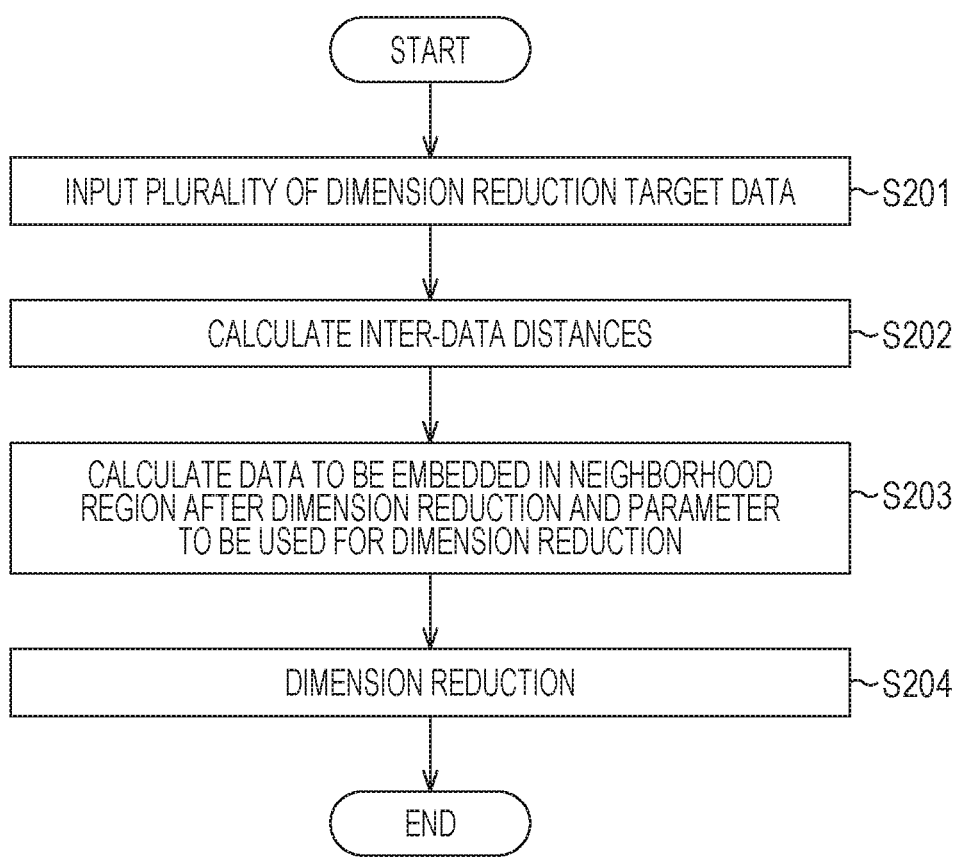
FIG. 2 is a flowchart of an example of a procedure of a process performed by the information processing apparatus according to the first embodiment.

FIG. 1 is a block diagram illustrating a configuration of an information processing apparatus 100 according to this embodiment. FIG. 2 is a flowchart of an example of a procedure of a process performed by the information processing apparatus 100. Hereinafter, the components in FIG. 1 will be described with reference to the flowchart of FIG. 2. Note that a control program used to perform a process described below is stored in a read only memory (ROM), not illustrated.

In FIG. 1, the information processing apparatus 100 includes a data input unit 101, an inter-data distance calculation unit 108, an input device 102, a neighborhood data determination unit 103, an output device 105, a mapping calculation unit 106, and a mapping storage unit 107.

First, in step S201 of FIG. 2, the data input unit 101 inputs data to be subjected to dimension reduction and information associated with the data. An unsupervised case is illustrated in this embodiment, and therefore, the data does not have a label. However, if the target data is derived from an image, for example, information associated with the data is also input. As the information associated with the data, the relationship between distribution obtained as a result of the dimension reduction and an image may be checked by the user by inputting an original image or an image based on the original image (such as a thumbnail image). Furthermore, the data input unit 101 may input imaging information such as an imaging angle at a time when an image is captured. Alternatively, when data to be input has recorded a time-series change of a target, the data input unit 101 may input information, such as an imaging time, and evaluate the association between a result which is finally obtained through manifold learning and the imaging time.

In step S202, the inter-data distance calculation unit 108 normalizes a feature dimension of all the data and obtains distances between the data. Specifically, dispersion of the target data is 1 in all feature values, and thereafter, distances between all the data are obtained. Furthermore, the neighborhood data determination unit 103 inputs information on a dimension reduction method, a neighborhood data determination rule, and a neighborhood embedding weight determination rule using the input device 102 operated by a user. The dimension reduction method specified here is a basic manifold learning system such as Isomap, LLE, or Laplacian Eigenmaps. The neighborhood data determination rule is a method for determining neighborhood data using a k-nearest neighbor algorithm or a size ε of a hypersphere. The neighborhood embedding weight determination rule is a method for determining a weight $W_{ij}$ (i and j are IDs of data) used when data to be embedded in a neighboring region determined by the neighborhood data determination rule is moved closer. As an option, a weight calculated in accordance with Expressions (1) to (4) below is used, for example. In this case, a weight for data items which are not to be embedded close to each other is set to 0, for example. Furthermore, $x_i^{(k)}$ in Expression (4) indicates a k-th neighborhood sample of $x_i$.

$$W_{i,j} = \|x_i - x_j\| \tag{1}$$

$$W_{i,j} = \exp\left(\frac{-\|x_i - x_j\|^2}{2\sigma^2}\right) \tag{2}$$

$$\sigma : Const. \quad \sigma > 0$$

$$W_{i,j} = 1 \tag{3}$$

$$W_{i,j} = \exp\left(\frac{-\|x_i - x_j\|^2}{\gamma_i \gamma_j}\right) \tag{4}$$

$$\gamma_i = \|x_i - x_i^{(k)}\|$$

In step S203, the neighborhood data determination unit 103 determines neighborhood data based on various methods specified by the user with reference to the distances between the data calculated by the inter-data distance calculation unit 108. Specifically, the neighborhood data determination unit 103 determines neighborhood data to be embedded in a neighborhood region after the dimension reduction in all the data to be subjected to the dimension reduction which is input by the data input unit 101 by determining a certain limit distance at a time of the dimension reduction.

Figure 4A:
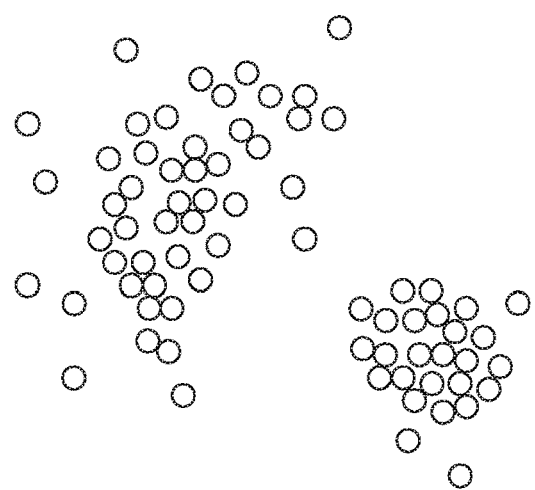
FIGS. 4A to 4C are diagrams illustrating a procedure of a determination of a size ε of a hypersphere for each data.

An example of the process performed in step S203 will be described with reference to FIGS. 4A to 4C, FIGS. 5A to 5D, and FIG. 6. FIG. 4A is a concept diagram illustrating a portion in which data is distributed in a separated manner in a high-dimensional space. As described above, the parameter k or ε which determines neighborhood data and which is included in the data is not fixed in this embodiment so that a result of the dimension reduction is obtained. For example, in a case where neighborhood data relative to the data is to be determined using a size ε of a hypersphere, hyperspheres having different sizes are set for different data using the data at centers, and data included in the hyperspheres is set as neighborhood data. Here, an optimum value of the size ε is searched for using the following reference while a value of the size ε is increased by an arbitrary pitch.

Figure 6:
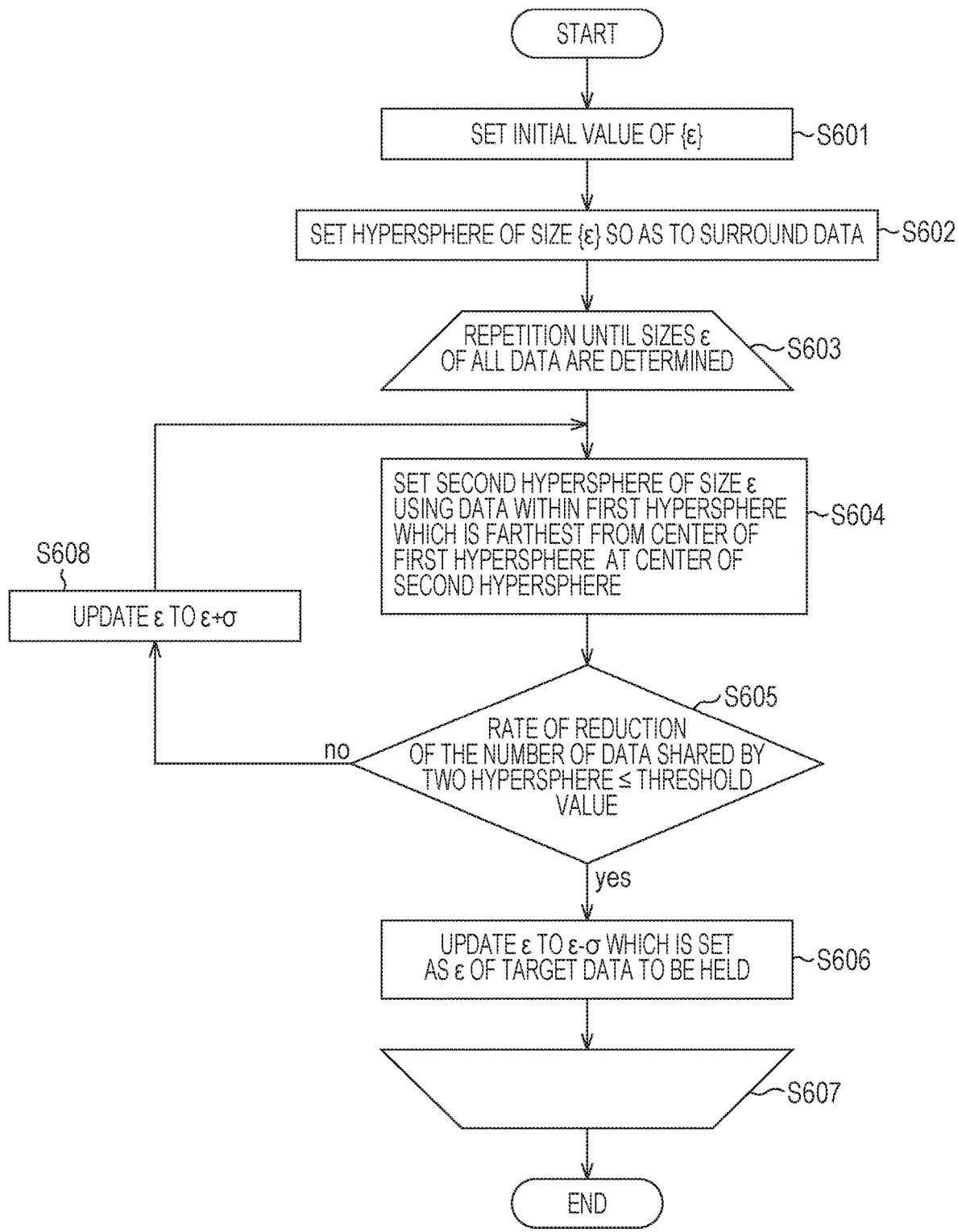
FIG. 6 is a flowchart of an example of a procedure of a process of determining neighborhood data using the size ε of the hypersphere.

FIG. 6 is a flowchart of an example of a procedure of the process of determining neighborhood data using a size ε of a hypersphere.

Figure 4B:
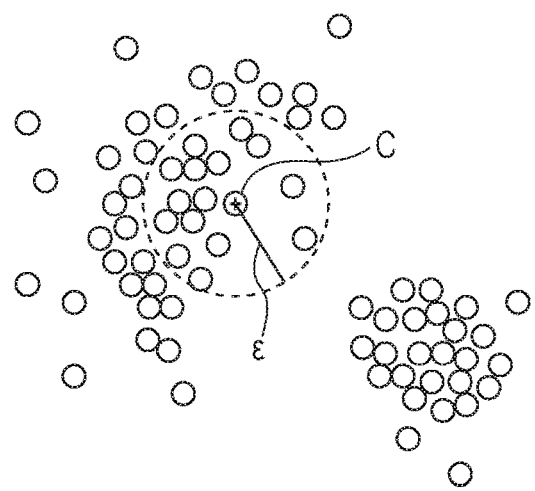

In step S601 of FIG. 6, the neighborhood data determination unit 103 sets an arbitrary initial value of the size ε. In step S602, the neighborhood data determination unit 103 sets hyperspheres having the size ε to the individual data. In FIG. 4B, a case where a hypersphere having certain data at a center C is set is illustrated.

Figure 4C:
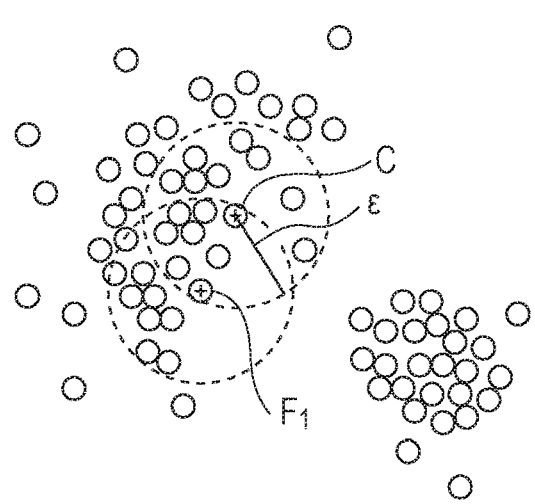

In step S603, a process from step S604 to step S608 below is repeatedly performed until sizes ε of all the data are determined. First, in step S604, the neighborhood data determination unit 103 determines data which is farthest from the center of the hypersphere as $F_1$, and sets another hypersphere of the same size ε having $F_1$ at a center. In FIG. 4C, a state in which the hypersphere is set by the process in step S604 is illustrated. According to the example in FIG. 4C, the number of data shared by the two hyperspheres corresponds to 50% (8 in 16) of the number of data included in the hypersphere having the center C.

In step S605, the neighborhood data determination unit 103 determines whether a rate of the number of data shared by the two hyperspheres is reduced by a rate set in advance or more. As a result of the determination, when the determination is affirmative, the process proceeds to step S606, and otherwise, the process proceeds to step S608. When the process in step S604 is performed for the first time, the process proceeds to step S608.

In step S608, the neighborhood data determination unit 103 increases the size ε by an arbitrary width σ, and thereafter, returns to step S604 where the same process is performed. By gradually increasing the size ε of the hypersphere, the farthest point from the center C of the hypersphere is set as a new $F_x$ point (x=1, 2, 3, and so on) step by step. Then a rate of the number of data shared by the two hyperspheres is calculated based on the new $F_x$ point.

When the size ε of the hypersphere reaches a certain value, the rate of the number of shared data is reduced by the rate set in advance or more. In this case, in step S606, the neighborhood data determination unit 103 determines a size (ε−σ) immediately before step S606 as the size ε which determines neighborhood data of the data associated with the center C.

Figure 5A:
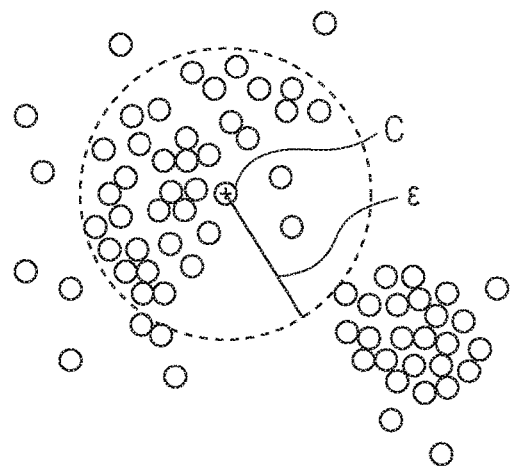
FIGS. 5A to 5D are diagrams illustrating a case where the size ε of the hypersphere is determined.
Figure 5B:
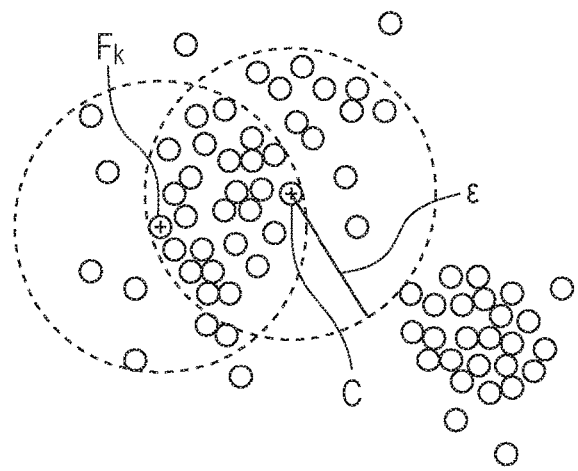
Figure 5C:
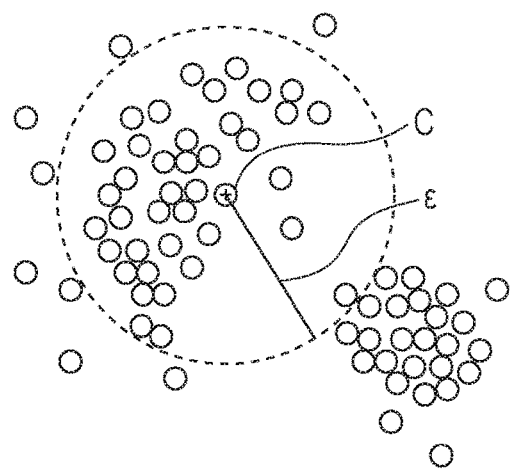
Figure 5D:
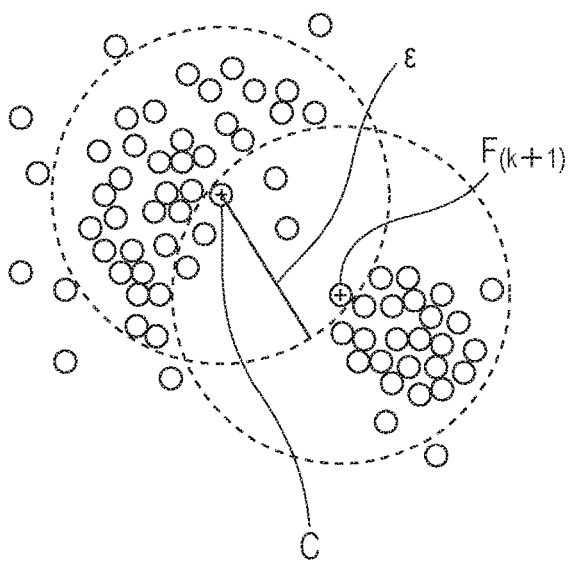

Here, a case where a threshold value used for the determination in step S605 is determined as reduction of 20% or more will be described. The size ε is increased, and when the size ε illustrated in FIG. 5A is reached, the farthest point from the center C in the hypersphere is determined as a point $F_k$. Thereafter, as illustrated in FIG. 5B, a hypersphere of the same size ε having the point $F_k$ at a center is set. According to the example in FIG. 5B, a rate of the number of data shared by the two hyperspheres corresponds to 70.3% (26 in 37) in the number of data included in the hypersphere having the center C. Thereafter, when the size ε is increased in step S608, the size ε illustrated in FIG. 5C is obtained. Subsequently, a farthest point from the center C of the hypersphere of the size ε is set as a point $F_{k+1}$, and a hypersphere is newly set as illustrated in FIG. 5D. However, the number of data shared by the two hyperspheres is 6 and a rate of the shared data is 15% in the example of FIG. 5D. In the determination in step S605, since a reduction rate exceeds 20%, the process proceeds to step S606 and the size ε in a preceding step which is illustrated in FIG. 5A is determined as a parameter of the neighborhood data held by the data associated with the center C. The series of processes are performed on all the data so that different data may have different sizes ε.

Note that the neighborhood number k of the k-nearest neighbor algorithm may be obtained by the same procedure. Specifically, the neighborhood number k is increased in step S608, the farthest point in a group of points of the neighborhood number k is set as an $F_x$ point in step S604, and it is determined whether a rate of the number of shared points (data) is reduced by a value equal to or smaller than a threshold value. In step S606, a neighborhood number (k−σ) immediately before step S606 is determined as a neighborhood number k which determines neighborhood data.

By this process, an aggregation of different neighborhood numbers k or an aggregation of sizes ε of hyperspheres may be obtained for different data. Hereinafter, the aggregation of the neighborhood numbers k and the aggregation of the sizes ε of the hyperspheres are denoted by {k} and {ε}, respectively. Note that when a total number of data to be subjected to the dimension reduction is denoted by n, {k} and {ε} are represented as follows: {k}={$k_1$, $k_2$, $k_3$, . . . , $k_n$} and {ε}={$ε_1$, $ε_2$, $ε_3$, . . . $ε_m$}.

Referring back to FIG. 2, in step S204, the mapping calculation unit 106 performs mapping (dimension reduction) by the dimension reduction method selected by the user in step S202 based on the value {k} or {ε} calculated in step S203.

For example, when Isomap is selected by the user, an edge is obtained by connecting neighborhoods of n data corresponding to the equation "{k}={$k_1$, $k_2$, $k_3$, . . . , $k_n$}" using the equation and assigns a weight $w_{ij}$ of the connected edge in accordance with Expression (1). Thereafter, a shortest geodesic line distance in geodesic line distances defined in a graph in which all points are connected to one another by an algorithm of Floyd-Warshall disclosed in Thomas H. Cormen, Charles E. Leiserson, Ronald L. Rivest and Clifford Stein, Introduction to Algorithms (first edition ed.), MIT Press and McGraw-Hill, Section 26.2, "The Floyd-Warshall algorithm", pp. 558-565, 1990 or an algorithm of Dijkstra disclosed in E. W. Dijkstra, A note on two problems in connexion with graphs, In Numerische Mathematik, 1, pp. 269-271, 1959. Thereafter, data distribution in a space of an input feature dimension or less is obtained by a multidimensional scaling method (MDS) so that the shortest geodesic line distance between all the points are reproduced.

A result of the process corresponds to a result of the dimension reduction. Here, the mapping calculation unit 106 stores the result of the dimension reduction in the mapping storage unit 107. Alternatively, the mapping calculation unit 106 may display the result of the dimension reduction in the output device 105. Note that any method may be employed in the display in addition to three-dimensional or two-dimensional display which allows a person to visually check data distribution as long as the result of the dimension reduction may be evaluated.

Furthermore, the method for reducing a dimension by non-linear conversion is described in detail mainly in the manifold learning in this embodiment. However, in an unsupervised state, a method for determining parameters obtains the same result both in the case of non-linear dimension reduction and in the case of linear dimension reduction. Therefore, a linear dimension reduction method taking locality into consideration (Locality Preserving Projections or the like) may be similarly employed.

As described above, according to this embodiment, the neighborhood number k of the k-nearest neighbor algorithm or the size ε of the hypersphere may be determined for each data. Accordingly, neighborhood data may be appropriately determined even in data distribution of Swiss Roll, for example, and a result of dimension reduction desired by the user may be obtained.

Second Embodiment

Hereinafter, a second embodiment of the disclosure will be described in detail with reference to the accompanying drawings. In this embodiment, a case where a result of dimension reduction desired by a user is obtained more accurately after a result of the dimension reduction is obtained by the first embodiment will be described as an example.

Figure 7:
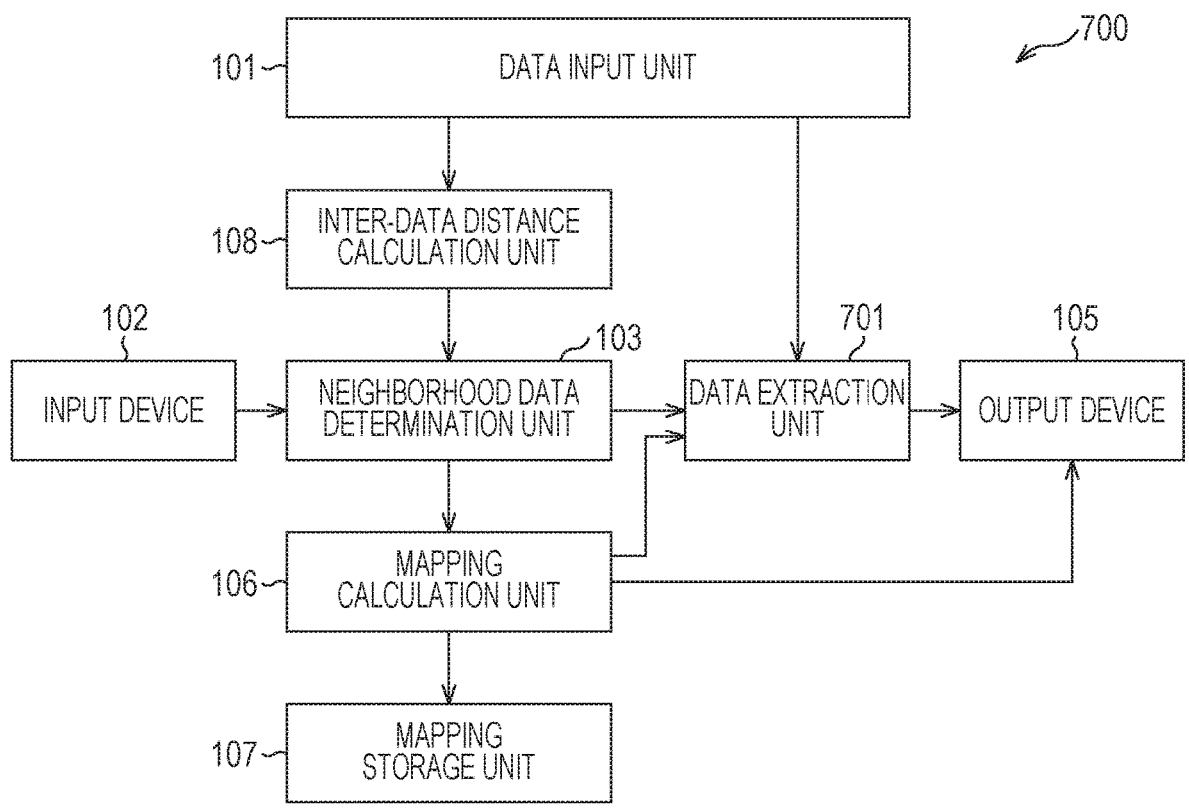
FIG. 7 is a block diagram illustrating a configuration of an image processing apparatus according to a second embodiment.

FIG. 7 is a block diagram illustrating a configuration of an image processing apparatus 700 according to this embodiment. The image processing apparatus 700 is different from the information processing apparatus 100 of FIG. 1 in that a data extraction unit 701 is additionally provided. Hereinafter, processes performed by components of the image processing apparatus 700 will be described with reference to a flowchart of FIG. 8.

Figure 8:
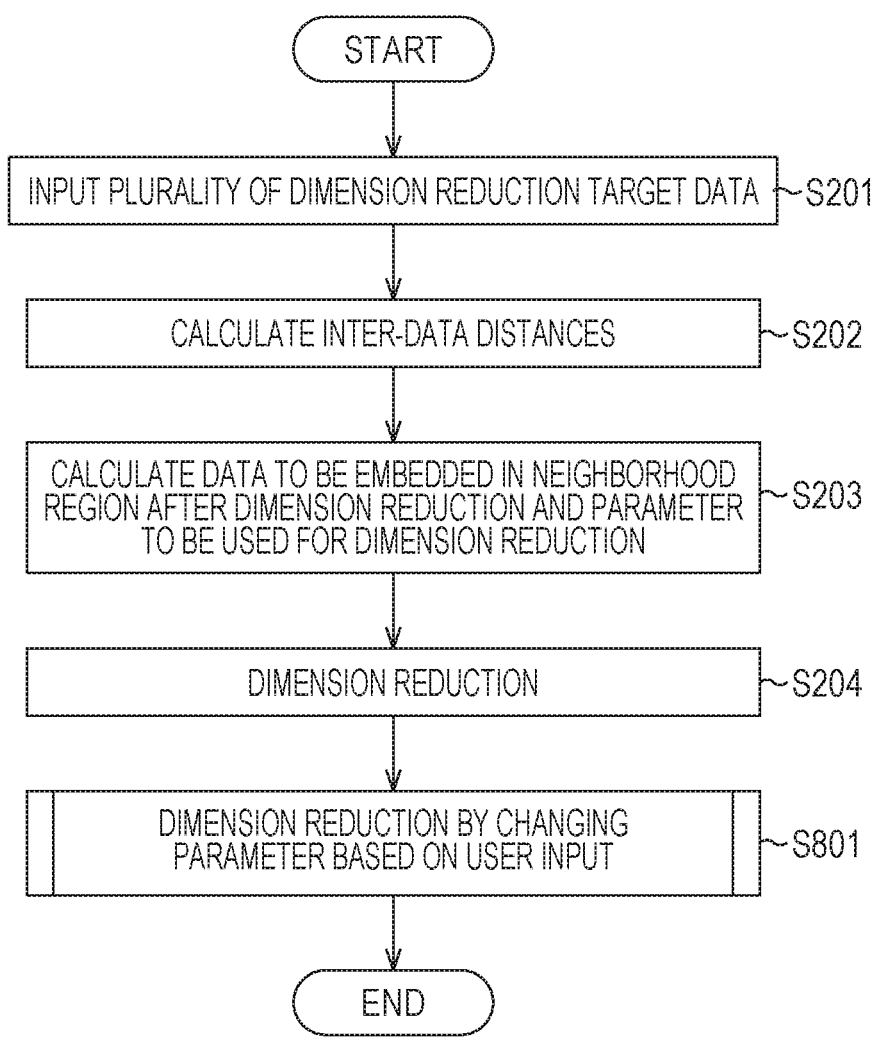
FIG. 8 is a flowchart of an example of a procedure of a process performed by the information processing apparatus according to the second embodiment.

In FIG. 8, a process from step S201 to step S204 is the same as the process from step S201 to step S204 in FIG. 2, and therefore, a description thereof is omitted. The process in step S801 is performed after a result of dimension reduction obtained by a procedure which is the same as that of the first embodiment is displayed in an output device 205 and the user has checked the result of the dimension reduction.

In step S801, the data extraction unit 701 performs correction by reflecting an intention of the user to the result of the dimension reduction obtained in step S204. Specifically, first, the data extraction unit 701 determines candidates of the distance relationships between data items (information indicating that the relationships between data items which are close to each other) after the dimension reduction which are to be input by the user. These candidates are determined in accordance with the neighborhood relationships set by a neighborhood data determination unit 103, a result of mapping corresponding to the set neighborhood relationships, and information associated with data input from a data input unit 101 (images corresponding to the data, for example). However, data in a feature space which is randomly selected and which are input by the data input unit 101 may be determined as the candidates of the distance relationships to be input by the user, or a neighborhood graph generated based on the neighborhood relationships determined by the neighborhood data determination unit 103 may be determined as the candidates to be input by the user. Alternatively, the candidates may be selected from the feature space after the mapping temporarily determined by a mapping calculation unit 106. The user checks the result of the dimension reduction displayed by the output device 105 and inputs a new condition using an input device 102. In this way, a result of the dimension reduction desired by the user may be more accurately obtained.

In general, features before the dimension reduction may include a feature value which is not associated with data distribution desired by the user (for example, a feature value corresponding to uniform distribution obtained irrespective of a property and a state of data). However, the neighborhood determination method and the method for determining the neighborhood relationship described above in the general manifold learning are simply based on distances between all input data in a feature space, and therefore, the neighborhood relationships desired by the user may not be obtained. Therefore, in this embodiment, information on data to be located in an isolated manner or data to be embedded in a neighboring region is externally supplied based on previous knowledge of the user or the like so that an amount of information is increased. In this way, a result of the dimension reduction desired by the user may be more accurately obtained.

Figure 12:
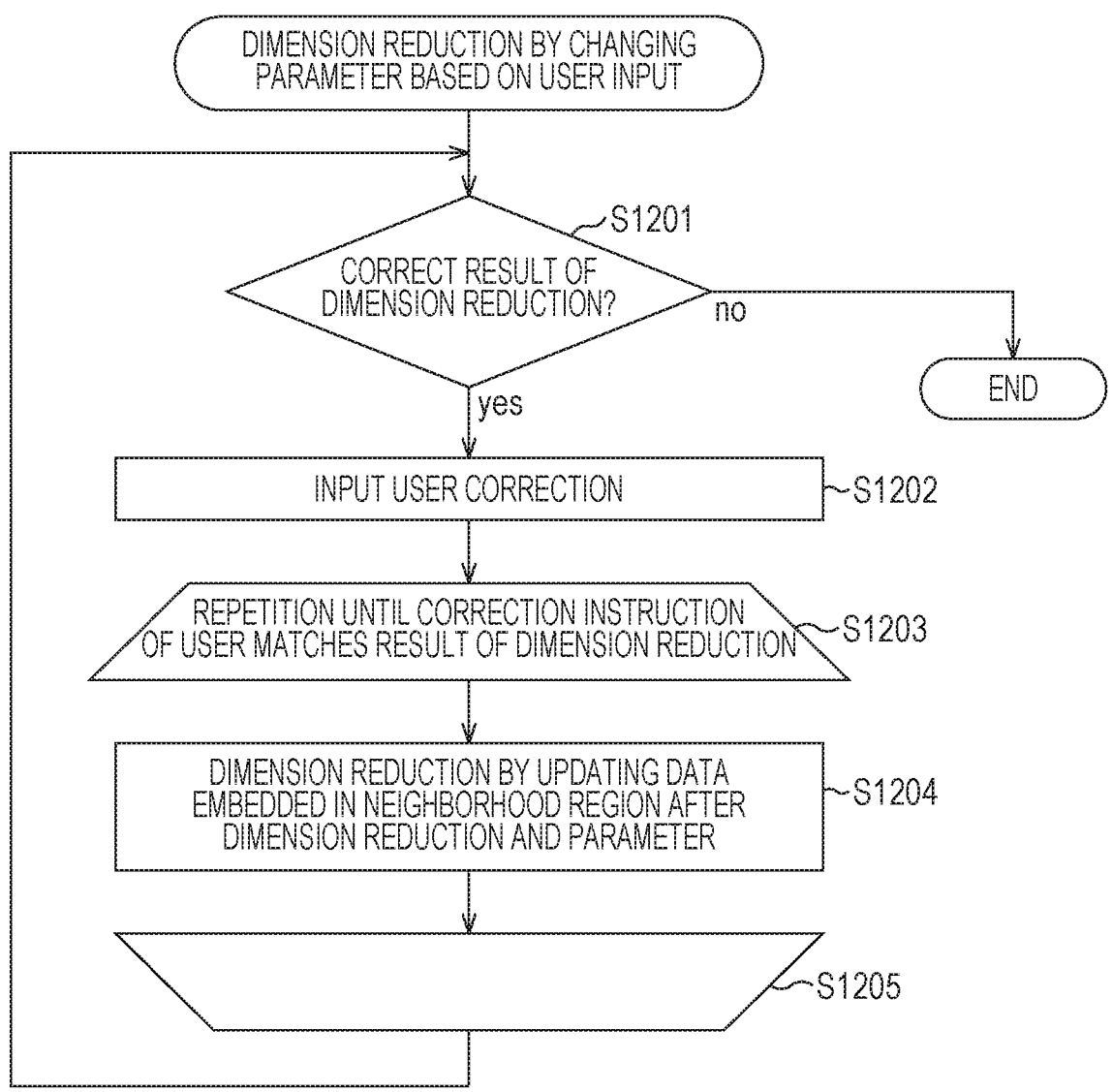
FIG. 12 is a flowchart of an example of a procedure of a process of obtaining a result of the dimension reduction which matches an order input by a user.

FIG. 12 is a flowchart of an example of a procedure of a process performed in step S801 of FIG. 8 illustrated in detail.

First, in step S1201, the data extraction unit 701 displays an extraction result based on the result of the dimension reduction in the output device 105 and determines whether an instruction indicating that a result of the dimension reduction is to be newly obtained has been issued by the user. As a result of the determination, when the determination is affirmative, the process proceeds to step S1202, and otherwise, the process is terminated.

In step S1202, the neighborhood data determination unit 103 obtains content input by the user using the input device 102. An example of the display of the result of the extraction performed by the data extraction unit 701 in the output device 105 and additional information input by the user who has checked the display using the input device 102 will be described hereinafter.

FIG. 9A is a diagram illustrating a screen which displays an image set which prompts the user to input the distance relationships between a number of data randomly extracted by the data extraction unit 701. In FIG. 9A, a section 901 displays images associated with the number of target data randomly selected by the data extraction unit 701. The user inputs an order of the neighborhood relationships of objects at a time of dimension reduction desired by the user in blanks 902 while allowing overlapping of the images. A plurality of types of order may be input in the blanks 902, and it is not necessarily the case that all the distance relationships are collectively input in one line. For example, three images and four images which are displayed in the section 901 may be separately input in two lines.

Figure 9B:
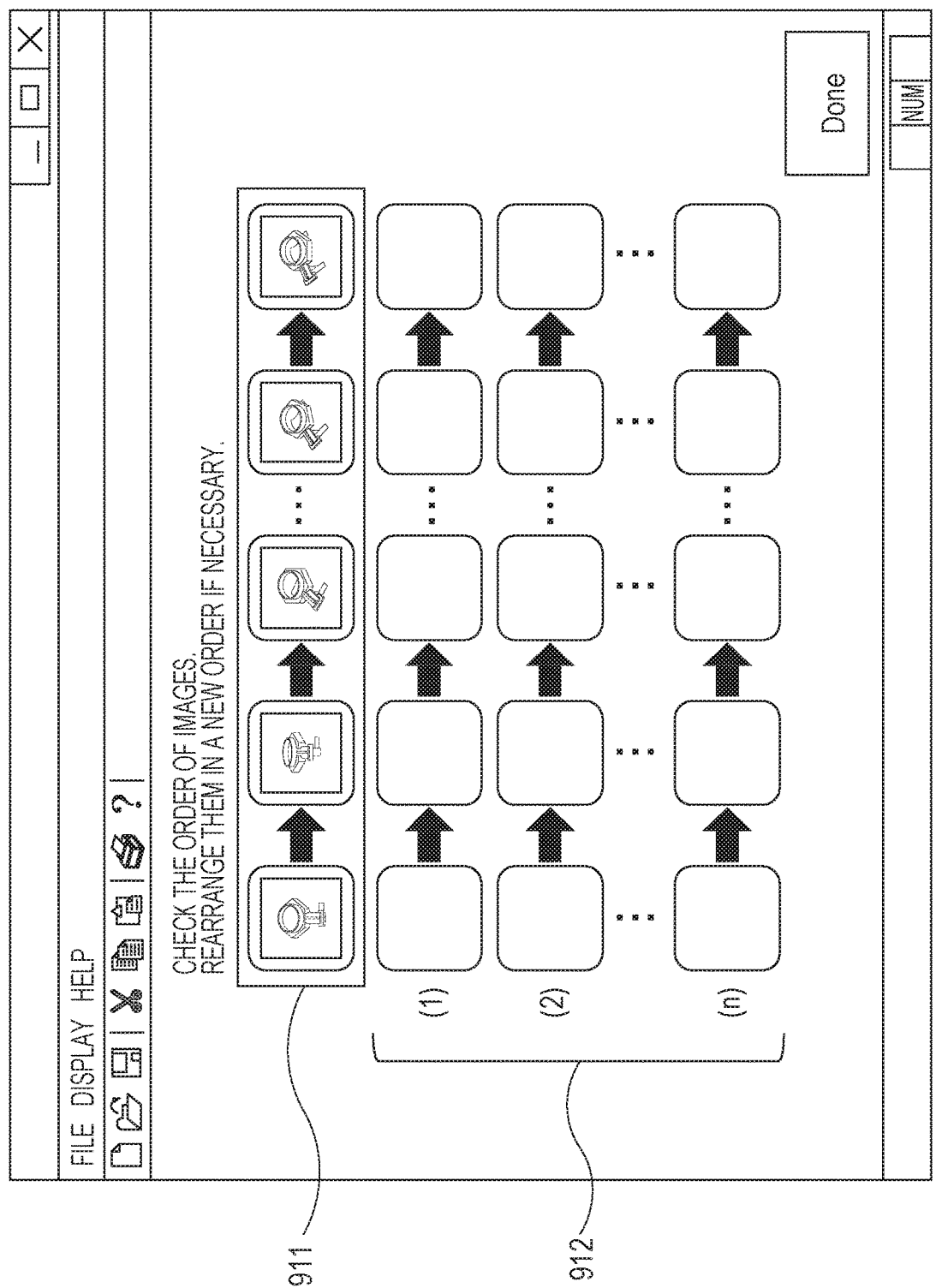

Furthermore, FIG. 9B is a diagram illustrating display of the distance relationships of the images which are obtained as a result of the dimension reduction and which are arranged in accordance with certain initial values by the data extraction unit 701. The user may check the result displayed in a section 911 and rearrange the data in modified orders in blanks 912. Although the images associated with the data which is rearranged are described as an example, conditions (times or imaging conditions) at a time of obtainment of the target data may be displayed instead of the images.

Figure 9C:
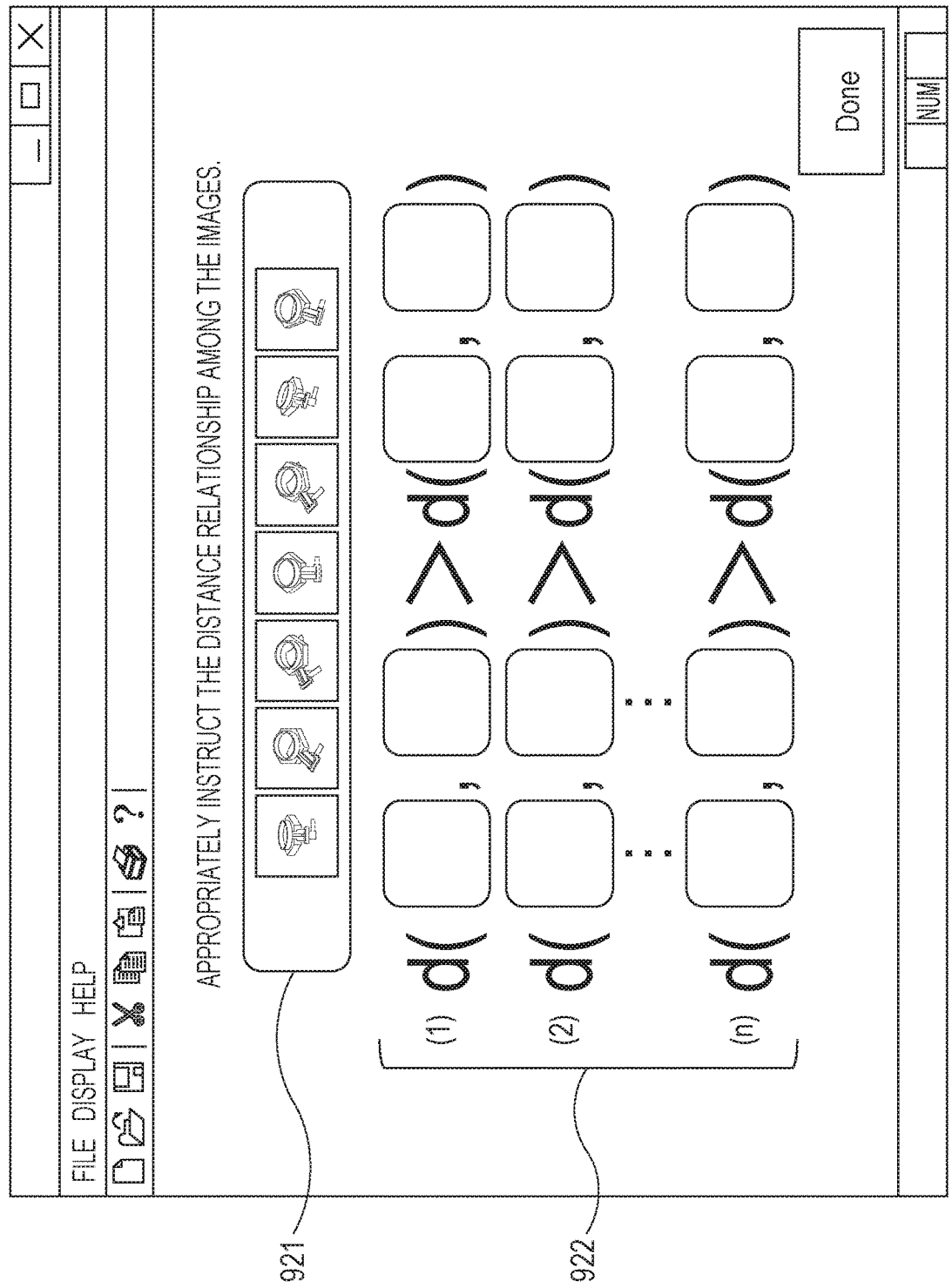

The method for indicating the order of the target data by causing the user to input the neighborhood relationships between the target data is illustrated in FIGS. 9A and 9B as examples. On the other hand, as illustrated in FIG. 9C, only the magnification relationships in distances obtained by comparison of distances between data in two points as a result displayed in a section 921 may be input in blanks 922. Furthermore, only a result of a determination as to whether certain data is located close to another data which has the neighborhood relationship with the data may be input by the user.

Referring back to FIG. 12, in step S1203, a process from step S1203 to step S1205 is repeatedly performed until the result of the dimension reduction performed based on the instruction issued by the user matches the result of the dimension reduction obtained by re-calculation. In step S1204, the neighborhood data determination unit 103 updates the parameter k or ε which determines neighborhood data, and the mapping calculation unit 106 performs dimension reduction based on the updated parameter k or ε.

FIG. 10 is a diagram illustrating positions of images of target objects in the distribution illustrated in FIG. 3A. Before the dimension reduction, the distribution in a Swiss Roll shape may not be recognized. Hereinafter, an algorithm of a process of updating the neighborhood relationships of the data by an input performed by the user on a result of the dimension reduction of the distribution illustrated in FIG. 10 so that a result to which an intention of the user is more accurately reflected is obtained will be described.

Algorithms for the examples illustrated in FIGS. 9A and 9B are substantially the same. In the case of FIG. 9A, dimension reduction is tentatively performed after a user input, and a result of the dimension reduction is compared with a result of the user input. However, in the case of FIG. 9B, the processing order is reversed.

For example, an order of randomly-extracted seven images which are tentatively output as a result of dimension reduction is different from an order input by the user, the parameters k and ε which determine the neighborhood data corresponding to different images are changed so that the order obtained as the result of the dimension reduction becomes close to information indicated by the user. For example, when the data is arranged in one line, leftmost data is located in a closest position. However, if data to be on a right side is positioned on a left side which is different from the order input by the user, the parameter k or ε is reduced from a current tentative value. Furthermore, if data to be on the left side is positioned on the right side, the parameter k or ε which determines the neighborhood data is increased. However, the parameter k or ε is linearly increased not only for the randomly-extracted data but also for surrounding data.

Figure 11A:
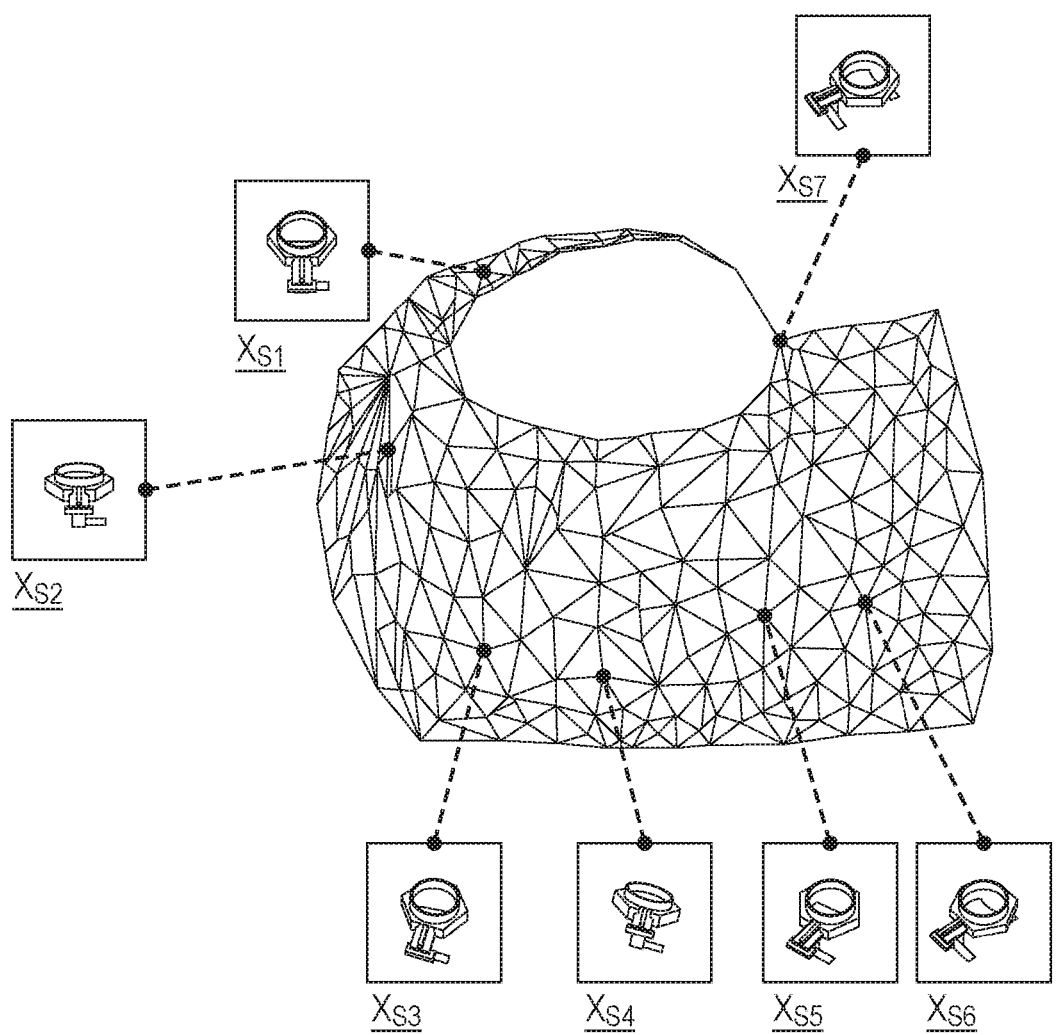
FIGS. 11A and 11B are diagrams illustrating a preferred result of dimension reduction and a non-preferred result of the dimension reduction, respectively.

Specifically, it is assumed that the distribution illustrated in FIG. 10 is tentatively subjected to the dimension reduction so that a result of the dimension reduction illustrated in FIG. 11A is obtained. However, it is assumed further that the neighborhood relationships of the data input by the user are represented as the following order: $X_{S1}$, $X_{S2}$, $X_{S3}$, $X_{S4}$, $X_{S5}$, $X_{S6}$, and $X_{S7}$. In the tentative result of the dimension reduction illustrated in FIG. 11A, the node $X_{S7}$ to be farthest from the node $X_{S1}$ is second closest to the node $X_{S1}$. Therefore, as a result of the input performed by the user, the parameter k or ε of the node $X_{S7}$ is reduced so that the tentative result of the dimension reduction described above is corrected. It is assumed here that a geodesic line distance between the node $X_{S7}$ to the node $X_{S6}$ which is the nearest neighbor after the dimension reduction is denoted by $G(X_{S7}, X_{S6})$. Then assuming that a parameter {k} or {ε} of data in a position far from the node $X_{S7}$ by the distance $G(X_{S7}, X_{S6})$ is denoted by $H(X_i)$ which is associated with each node $X_i$, $H(X_i)$ may be linearly changed by Expression (5) (p=7 and q=6) below. Furthermore, the number of times the change is performed is denoted by r, and the value $H(X_i)$ is represented by $H_r(X_i)$. Here, α is a constant.

$$H_r(x_i) = \frac{\alpha \cdot G(x_{Sp}, x_i)}{G(x_{Sp}, x_{Sq})} H_{r-1}(x_i) \quad (5)$$

Figure 11B:
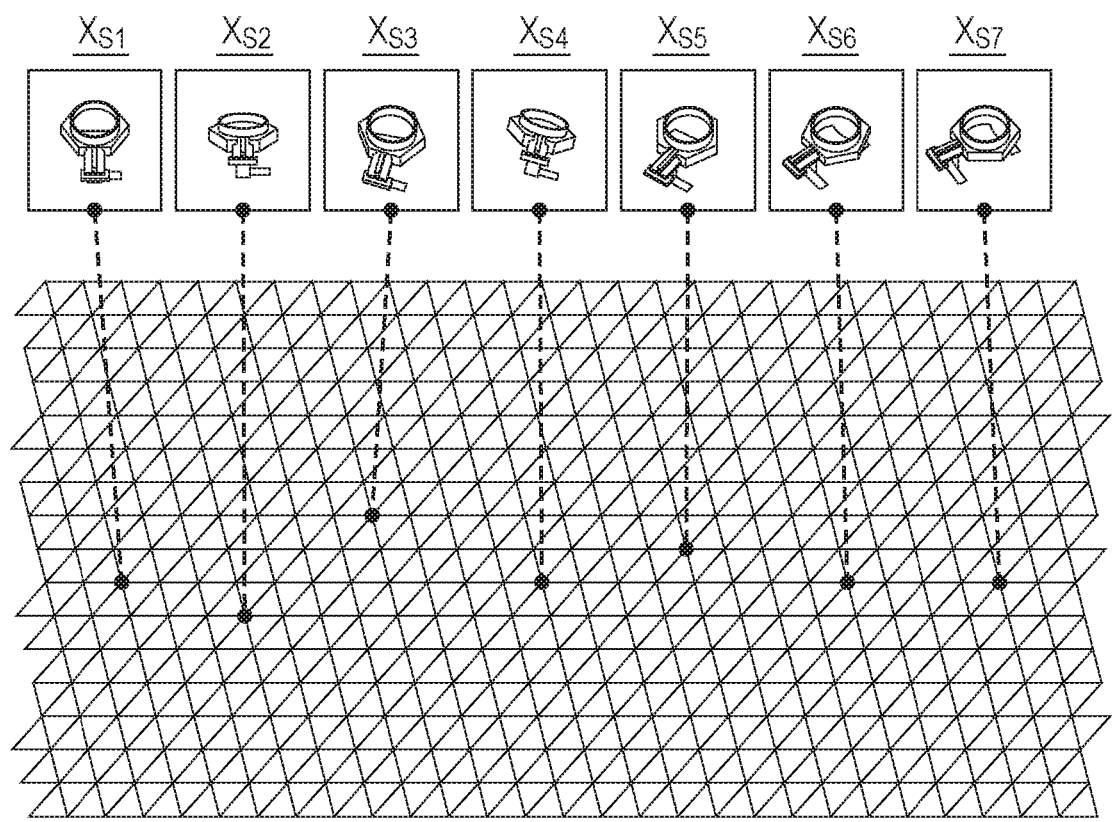

The mapping calculation unit 106 performs the dimension reduction again using the parameter {k} or {ε} which is newly obtained by the conversion and the process from step S1203 to step S1205 is repeatedly performed until matching with the order input by the user is attained. By this repeated process, data which is not desired by the user to be closely positioned may be reset as data not to be embedded in a neighboring region. By repeatedly performing the calculation described above, the manifold illustrated in FIG. 3A may be finally represented as low-dimensional data while the neighborhood relationships between the data input by the user are maintained as illustrated in FIG. 11B.

As described above, according to this embodiment, a result of dimension reduction desired by the user is reflected to a tentative result of dimension reduction, and therefore, a result of the dimension reduction desired by the user may be more accurately obtained.

Third Embodiment

Figure 13A:
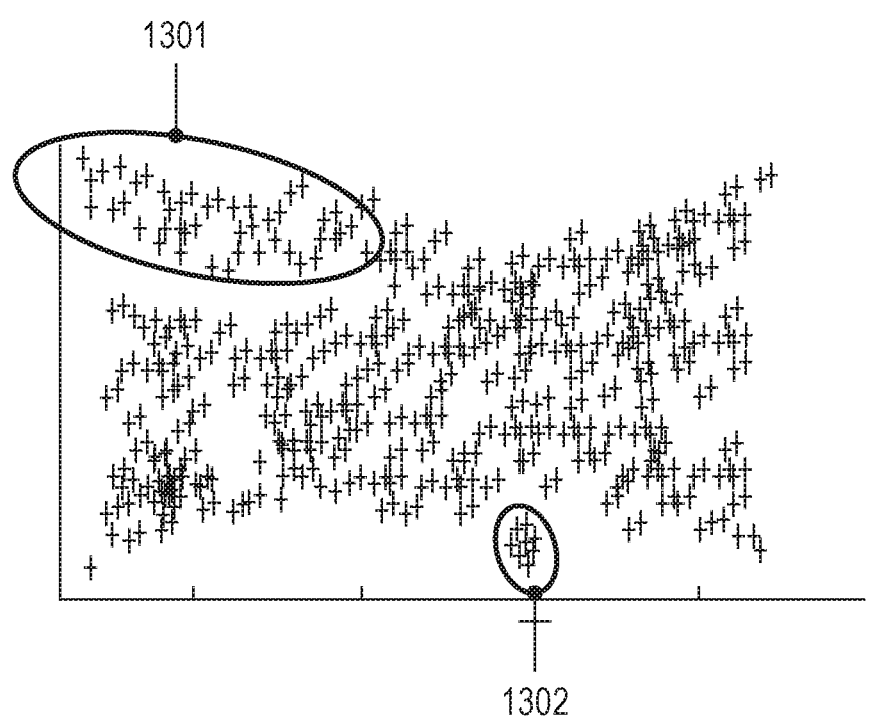
FIGS. 13A and 13B are graphs illustrating distribution obtained when data branching and data aggregation is generated and distribution obtained when data branding or data aggregation is not generated, respectively.
Figure 13B:
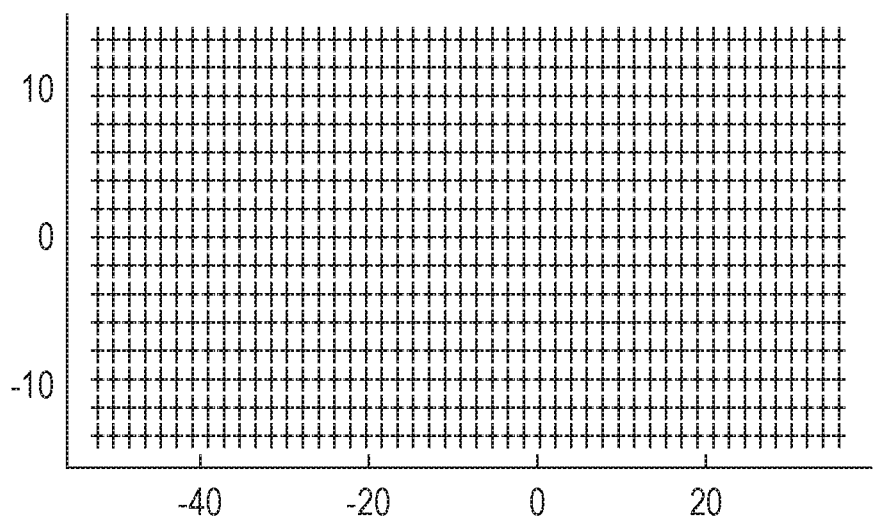

Hereinafter, a third embodiment of the disclosure will be described in detail with reference to the accompanying drawings. As a result of dimension reduction, data branch 1301 or data aggregation 1302 in distribution which is not to be generated may be generated as illustrated in FIG. 13A. This is because the optimum neighborhood relationships are not set for individual data, and therefore, if distribution of information of original data is that illustrated in FIG. 13B, the data branch or the data aggregation is unnecessary information when desired information is to be extracted. Therefore, in this embodiment, the more neighborhood relationships are set in accordance with a process below, and the neighborhood relationships between data are updated so that a result which is as close as possible to the distribution illustrated in FIG. 13B is obtained. Note that a configuration of an information processing apparatus of this embodiment is the same as that illustrated in FIG. 7, and therefore, a description thereof is omitted.

Figure 14:
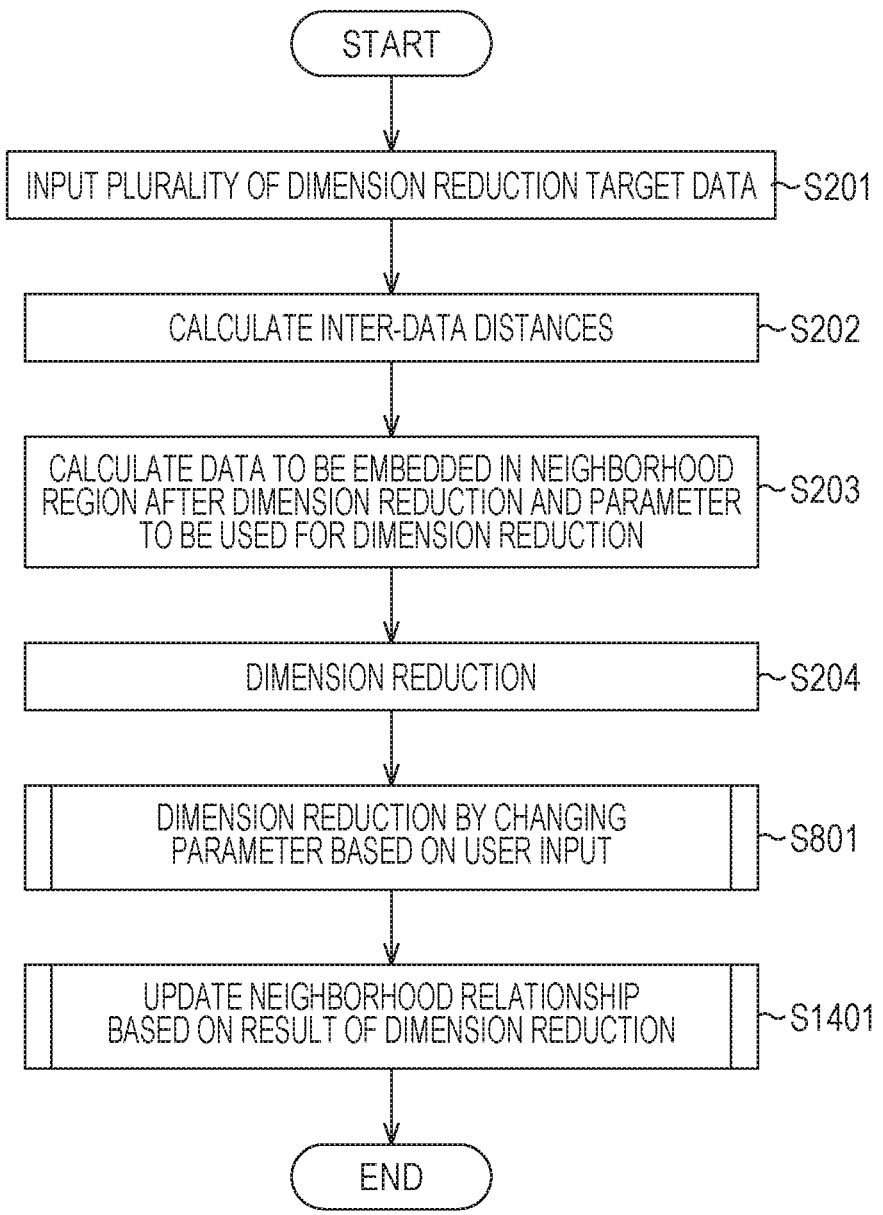
FIG. 14 is a flowchart of an example of a procedure of a process performed by an information processing apparatus according to a third embodiment.

FIG. 14 is a flowchart of an example of a procedure of a process of obtaining a result of dimension reduction. Note that a process from step S202 to step S204 and a process in step S801 in FIG. 14 are the same as those in FIG. 8, respectively. Hereinafter, a process in step S1401 will be described in detail. The process in step S801 in FIG. 14 may be omitted where appropriate. Hereinafter, parameters {k} and {ε} are denoted by $\{k\}_{(0)}$ and $\{\varepsilon\}_{(0)}$, respectively, for simplicity of description.

Figure 15:
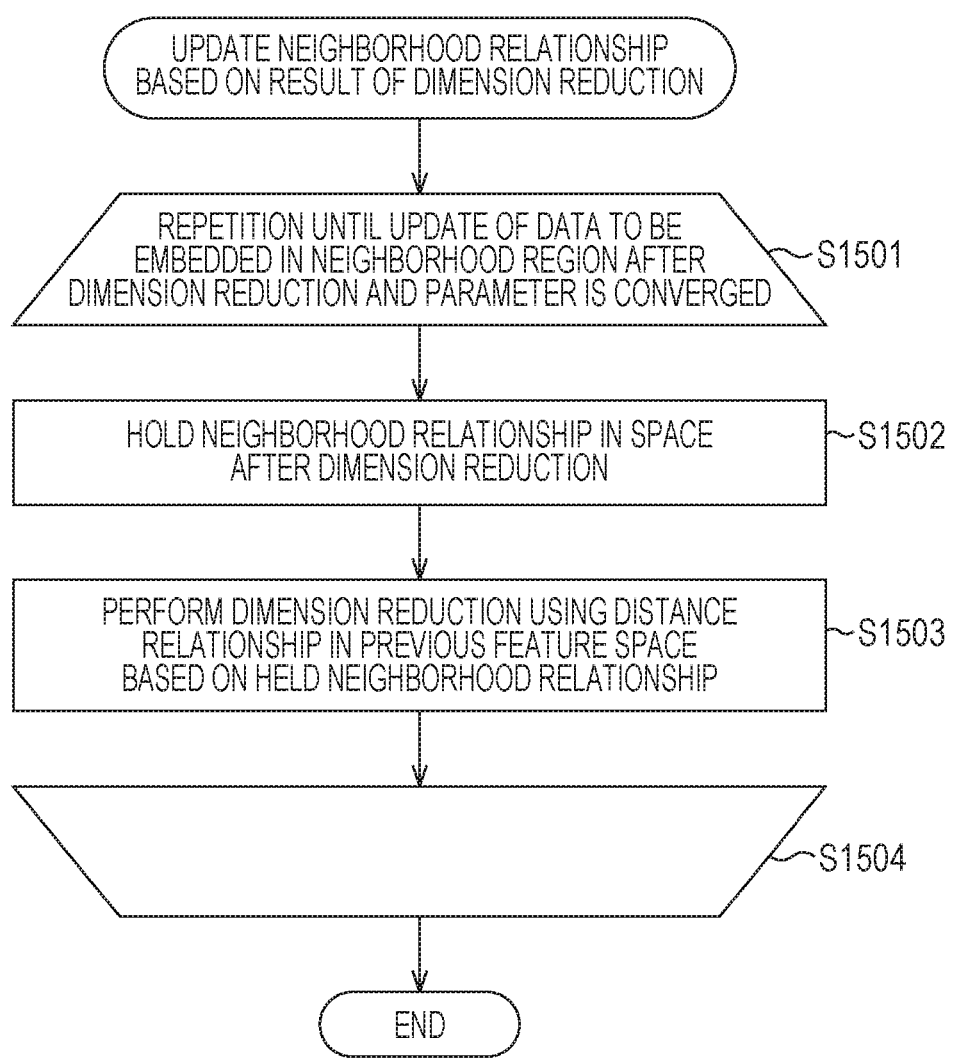
FIG. 15 is a flowchart of an example of a procedure of a detailed process of updating the neighborhood relationship based on a result of dimension reduction.

FIG. 15 is a flowchart of an example of a procedure of the process in step S1401 of FIG. 14 illustrated in detail. First, dimension reduction from d-dimensions in a feature space to $p_0$-dimensions is performed by the process from step S201 to step S204 and the process in step S801, and the neighborhood relationships desired by the user are reflected to distribution of target data approximately in the $p_0$-dimensions. Thereafter, a result of the dimension reduction desired by the user is obtained by further performing correction of the neighborhood relationships in a repetition manner in a process from step S1501 to step S1504. Therefore, first, a neighborhood data determination unit 103 determines and updates the new neighborhood relationships in $P_0$ feature spaces newly obtained in step S1502.

Here, as with the parameters $\{k\}_{(0)}$ and $\{\varepsilon\}_{(0)}$, parameters which newly set the neighborhood relationships in $p_0$-dimensional space after the dimension reduction are denoted by $\{k\}_{(1)}$ and $\{\varepsilon\}_{(1)}$, respectively. In step S1502, the method for determining the parameter k or ε which determines neighborhood data in the d-dimensional feature space for each data which is described above is employed in the $p_0$-dimensional space after the dimension reduction. Then the parameter $\{k\}_{(1)}$ or $\{\varepsilon\}_{(1)}$ is determined based on the neighborhood relationships in the $p_0$-dimensional space. Subsequently, in step S1503, a mapping calculation unit 106 holds all neighborhood data which is determined from target data in the $p_0$-dimensional space in accordance with the parameter $\{k\}_{(1)}$ or $\{\varepsilon\}_{(1)}$, and performs the dimension reduction of the target data again with reference to the distance relationships in the d-dimensional feature space which serves as a feature value. Note that the neighborhood data which is determined by the parameter $\{k\}_{(1)}$ or $\{\varepsilon\}_{(1)}$ is not simply moved to a neighboring region in the d-dimensional feature space. The neighborhood relationships in the $p_0$-dimensional space is normally different from the neighborhood relationships in the d-dimensional space.

In this case, assuming that a dimension in a feature space obtained as a result of the dimension reduction which is newly performed is set as a $p_1$ dimensions ($P_1$ may be equal to $p_0$), a parameter $\{k\}_{(2)}$ or $\{\varepsilon\}_{(2)}$ which sets the new neighborhood relationships is obtained by the same procedure. Thereafter, the same process from step S1501 to step S1504 is repeatedly performed.

This process is repeatedly performed until neighborhood data of all target data may not be finally updated. In this way, a result of the dimension reduction to which local data distribution is further reflected may be obtained. Note that, also in a case of an example illustrated in FIG. 9C, only update of the magnitude relationships of distances between points is performed, and therefore, a result of dimension reduction may be obtained while the magnitude relationships of distances are held by the same method described above.

Furthermore, the method for reducing a dimension by non-linear conversion is described in detail mainly in the manifold learning in this embodiment. However, in an unsupervised state, a method for determining parameters obtains the same result both in the case of non-linear dimension reduction and in the case of linear dimension reduction. Therefore, a linear dimension reduction method taking locality into consideration (Locality Preserving Projections or the like) may be similarly employed.

Fourth Embodiment

Hereinafter, a fourth embodiment of the disclosure will be described in detail with reference to the accompanying drawings. In this embodiment, a case where supervised dimension reduction is performed will be described as an example. Note that a configuration of an information processing apparatus according to this embodiment is the same as that of FIG. 1, and therefore, a description thereof is omitted.

Concrete examples of data to be subjected to dimension reduction in this embodiment include high dimensional data obtained by extracting a plurality of features from images obtained by capturing a plurality of types of object to which different labels are assigned for different types. Furthermore, the images of the plurality of types of object may be images obtained by capturing faces and bodies of various persons, animals, organs, vehicles, and the like. The concrete examples may further include high-dimensional data obtained by extracting a plurality of features from a series of images obtained by capturing the same target in a time series manner, such as monitoring images in a town, to which labels indicating a "normal operation" or an "abnormal operation" are assigned. Furthermore, the method is versatile and may be generally employed in a case where behavior and relevance of high-dimensional data are analyzed, and therefore, data may not be particularly an image, and may be audio, other signals, or a feature of a combination of audio and a signal.

The case where supervised dimension reduction is performed in this embodiment, and therefore, all data to be subjected to the dimension reduction has class labels to be classified. Furthermore, this embodiment is applicable to supervised dimension reduction methods (Local Discriminant Information, Local Fisher Discriminant Analysis, and the like) which are generally used. Then a method for reflecting more accurately the local neighborhood relationships to a mapping result when linear mapping is performed in this method will be described. In the supervised dimension reduction methods described above, the local neighborhood relationships are reflected to a mapping result in similar methods. Specifically, neighborhood data of each data is set by a neighborhood number k of the k-nearest neighbor algorithm or all data included in an inside of a hypersphere of a size ε having arbitrary data at a center is set as neighborhood data. Accordingly, this embodiment is applicable to any of the supervised dimension reduction methods described above.

Figure 16:
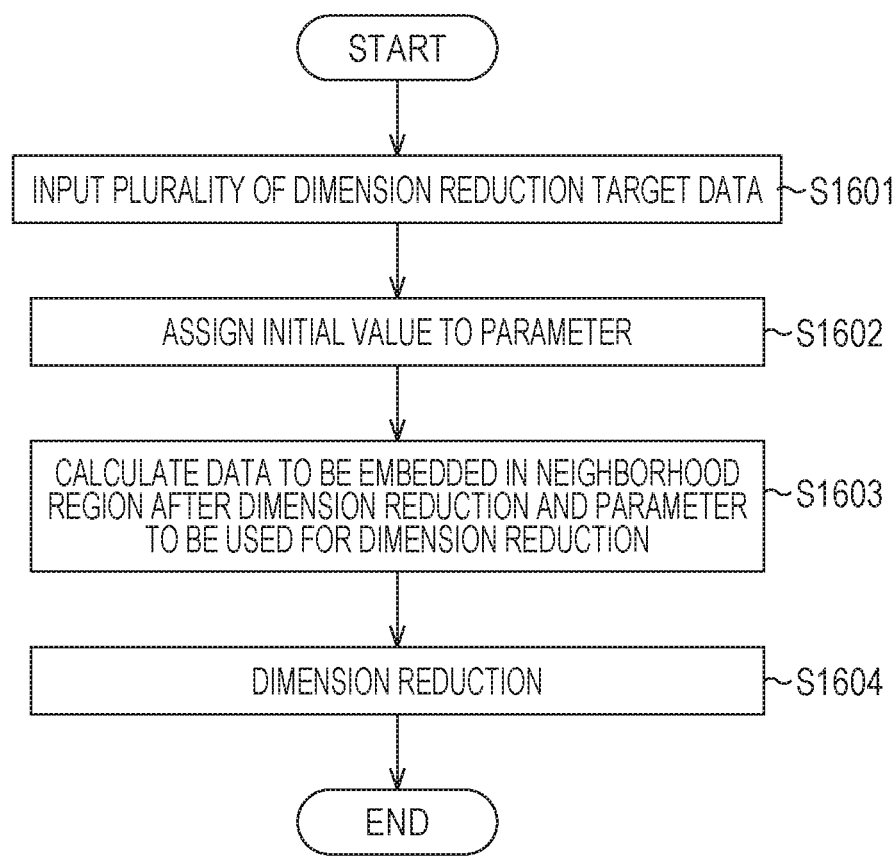
FIG. 16 is a flowchart of an example of a procedure of a process performed by an information processing apparatus according to a fourth embodiment.

FIG. 16 is a flowchart of an example of a procedure of a process according to this embodiment. Here, the number of classes of input data for classification is 2 or more and each data has a label of one of the classes assigned thereto. Furthermore, d feature values (d≥2) are extracted from the data, and each data is represented by a d feature value.

In step S1601, a data input unit 101 inputs data to be subjected to dimension reduction having labels. In step S1602, an inter-data distance calculation unit 108 normalizes feature dimensions of all the data. Specifically, dispersion of the target data is 1 in all feature values. Thereafter, distances between all the data are obtained. Then a neighborhood data determination unit 103 assigns an appropriate initial value to a parameter k or ε (for example, $\{k\}=\{1, 1, 1, \ldots, 1\}$ or ε=distance to a nearest point). Furthermore, the neighborhood data determination unit 103 inputs information on a dimension reduction method, a neighborhood data determination rule, and a neighborhood embedding weight determination rule using the input device 102 operated by a user. Here, a basic supervised dimension reduction method, such as Local Discriminant Information or Local Fisher Discriminant Analysis, is specified. The neighborhood date determination rule and the neighborhood embedding weight determination rule are the same as those of the first embodiment.

In step S1603, the neighborhood data determination unit 103 increases the initial value set in step S1602 so as to obtain a maximum value which does not include data having a different label in neighborhood data. The maximum value is determined as a tentative parameter k or ε of each data.

Figure 21A:
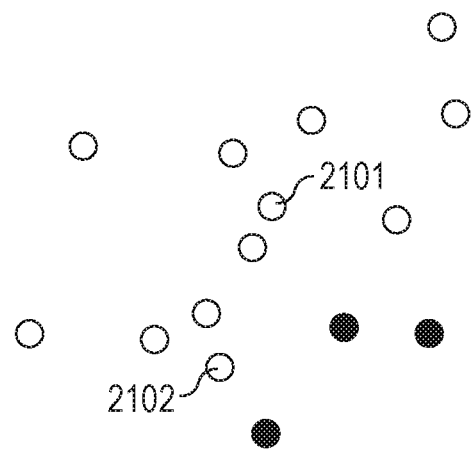
FIGS. 21A to 21C are diagrams illustrating a procedure of a determination of a parameter k according to the fourth embodiment.
Figure 21B:
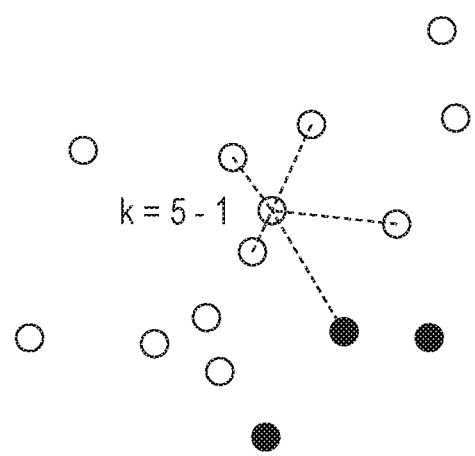

Specifically, as illustrated in FIG. 21A, a case where data to which two types of class labels are assigned is distributed in a high-dimensional feature space is described as an example. In FIG. 21A, class-1 data is denoted by white circles and class-2 data is denoted by black circles. Here, two class-1 data items 2101 and 2102 are focused and neighborhood numbers k are obtained from these data items. When the neighborhood number k having an initial value of 1 of the data item 2101 is increased so that a neighborhood point is searched for, class-2 data having a different label is reached when the neighborhood number k is 5 as illustrated in FIG. 21B. In this case, the neighborhood number k held by the data item 2101 is set to 4.

Figure 21C:
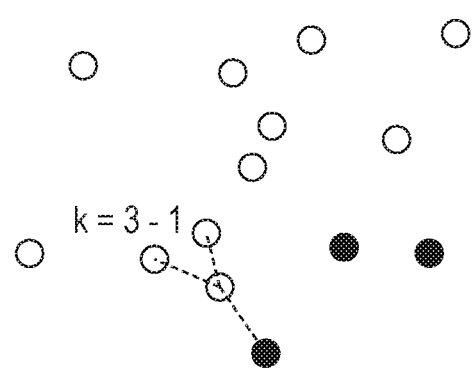

Similarly, when the neighborhood number k having an initial value of 1 of the data item 2102 is increased so that a neighborhood point is searched for, class-2 data having a different label is reached when the neighborhood number k is 3 as illustrated in FIG. 21C. Therefore, the neighborhood number k held by the data item 2102 is set to 2. Note that the same process may be performed in a case where the search is performed while a size ε is increased using a hypersphere having the size ε.

Based on the rule described above, the parameters k (or ε) for determining neighborhood data of all the classes and all the data in a feature space before dimension reduction are set. Accordingly, small neighborhood numbers k may be set in portions which use a large amount of information whereas large neighborhood numbers k may be set in regions in which data having the same class label gathers, and consequently, generalization ability may be improved.

Furthermore, in step S1603, the neighborhood data determination unit 103 may multiply the parameter {k} or {ε} determined in step S1202 by a constant α so as to obtain a parameter K (α×k) or E (α×ε), and the constant α of an optimum value may be searched for by cross validation or the like.

In step S1604, a mapping calculation unit 106 performs dimension reduction by the dimension reduction method selected by the user in step S1602 based on the parameter {k} or {ε} determined in step S1603. Then the mapping calculation unit 106 stores a result of the dimension reduction in a mapping storage unit 107.

Figure 17:
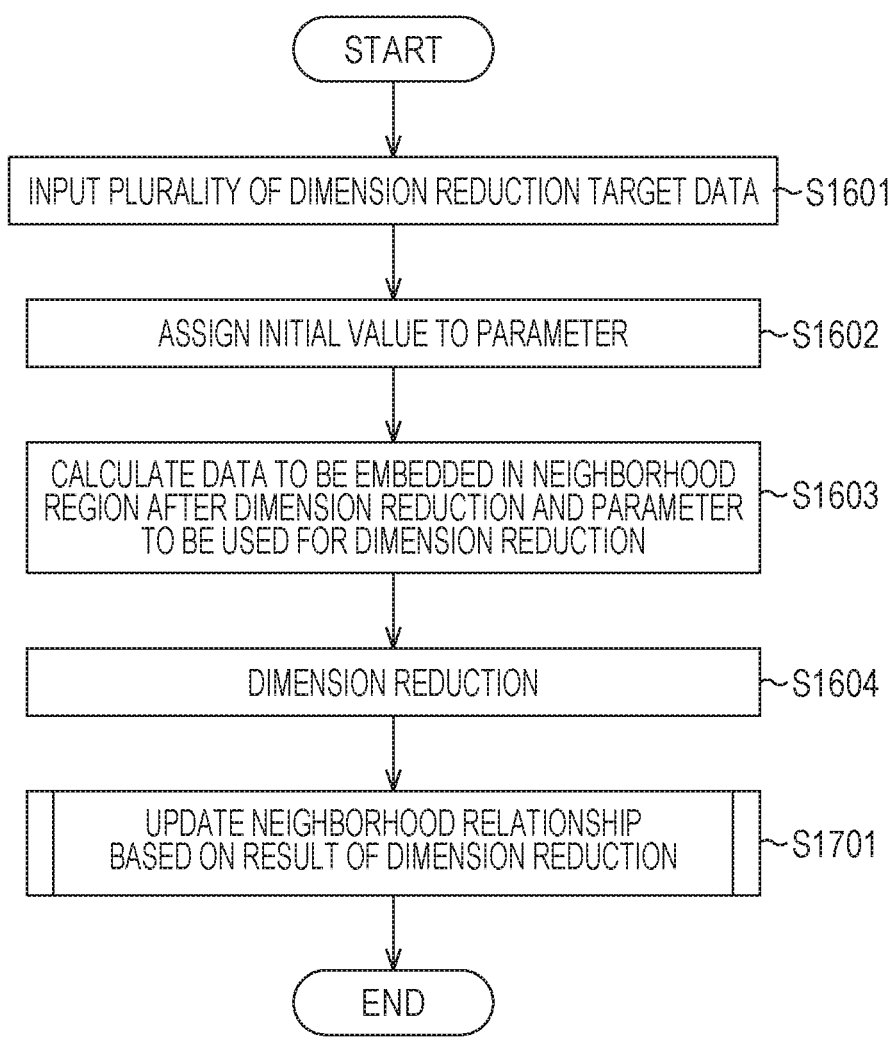
FIG. 17 is a flowchart of an example of a procedure of another process performed by the information processing apparatus according to the fourth embodiment.

Although a result of the dimension reduction is obtained in the procedure illustrated in FIG. 16 as described above in this embodiment, another result of the dimension reduction may be obtained where appropriate by repeatedly performing correction of the neighborhood relationships in accordance with a procedure illustrated in FIG. 17. Note that a process from step S1601 to step S1604 in FIG. 17 is the same as that in FIG. 16, and therefore, a description thereof is omitted.

In step S1701, a result of dimension reduction obtained in step S1604 is updated to the relationships which are further close to the neighborhood relationships obtained after the dimension reduction. Specifically, the neighborhood relationships are determined and updated in a $p_0$-dimensional feature space obtained by performing the dimension reduction using a parameter {k} or {ε}. Hereinafter, the parameters {k} and {ε} are represented as $\{k\}_{(0)}$ and $\{\varepsilon\}_{(0)}$, respectively.

Figure 18:
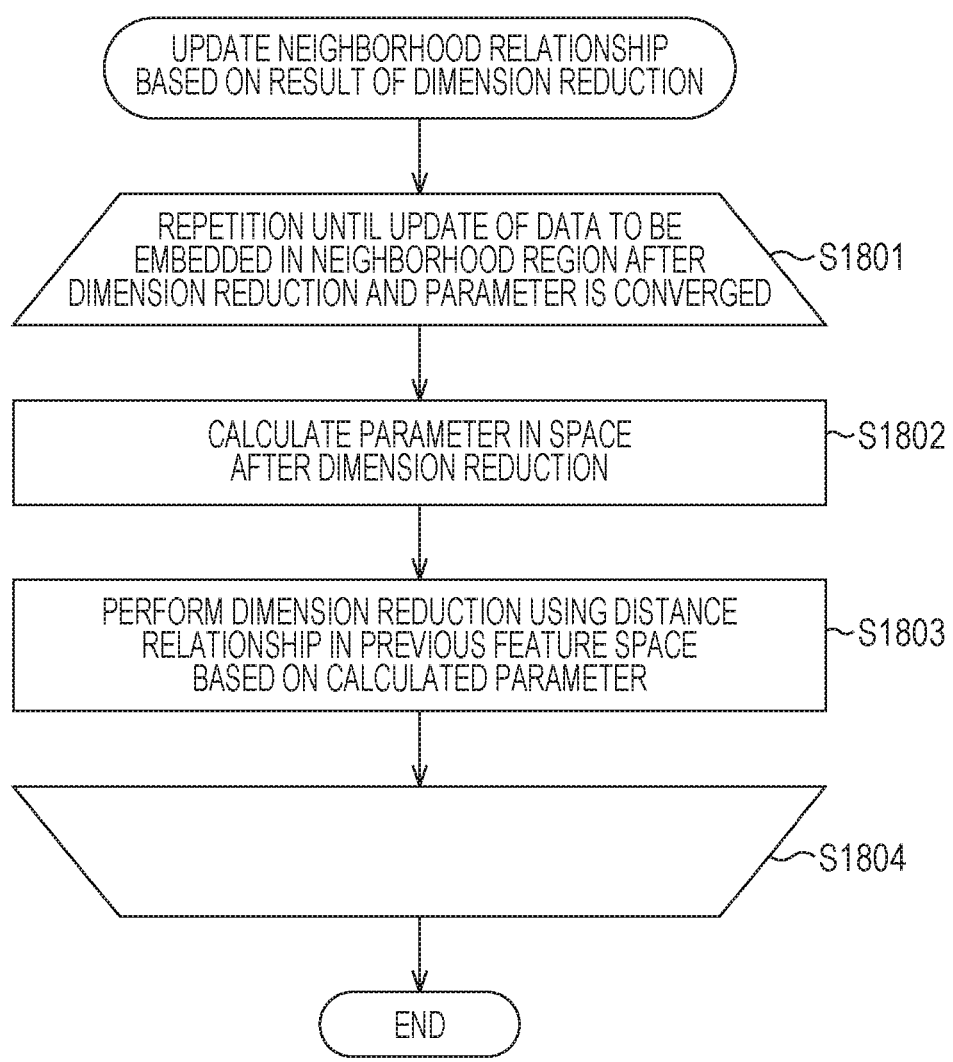
FIG. 18 is a flowchart of an example of a procedure of a detailed process of updating the neighborhood relationship based on a result of dimension reduction.

FIG. 18 is a flowchart of an example of a procedure of the process in step S1701 of FIG. 17 illustrated in detail. Here, as with the parameters $\{k\}_{(0)}$ and $\{\varepsilon\}_{(0)}$, parameters which newly set the neighborhood relationships in $p_0$-dimensional space after the dimension reduction are denoted by $\{k\}_{(1)}$ and $\{\varepsilon\}_{(1)}$. First, in step S1802, the parameter $\{k\}_{(1)}$ or $\{\varepsilon\}_{(1)}$ is determined with reference to a label based on the neighborhood relationships in the $p_0$-dimensional space. The method employed in the d-dimensional feature space described with reference to FIGS. 21A to 21C is also employed in this method.

Subsequently, in step S1803, the mapping calculation unit 106 holds all neighborhood data which is determined from target data in the $p_0$-dimensional space in accordance with the parameter $\{k\}_{(1)}$ or $\{\varepsilon\}_{(1)}$, and performs the dimension reduction of the target data again with reference to the distance relationships in the d-dimensional feature space before the dimension reduction. Note that neighborhood data which is determined by the parameter $\{k\}_{(1)}$ or $\{\varepsilon\}_{(1)}$ is not simply moved to a neighboring region in the d-dimensional feature space. The neighborhood relationship in the $p_0$-dimensional space is normally different from the neighborhood relationship in the d-dimensional space.

In this case, assuming that a dimension in a feature space obtained as a result of dimension reduction which is newly performed is set as a $p_1$ dimension ($P_1$ may be equal to $p_0$), a parameter $\{k\}_{(2)}$ or $\{\varepsilon\}_{(2)}$ which sets the new neighborhood relationships is obtained by the same procedure. Thereafter, the same process is repeatedly performed from step S1801 to step S1804. This process is repeatedly performed until neighborhood data of all target data may not be finally updated. In this way, a result of dimension reduction to which local data distribution is further reflected may be obtained even in a case of supervised dimension reduction.

Fifth Embodiment

Hereinafter, a fifth embodiment of the disclosure will be described in detail with reference to the accompanying drawings. As with the fourth embodiment, supervised dimension reduction is performed in this embodiment. A parameter k or ε which determines neighborhood data is changed after the dimension reduction for each class, and data in the same class share the same parameter k or ε. Note that a configuration of an information processing apparatus according to this embodiment is the same as that of FIG. 1, and therefore, a description thereof is omitted.

A processing procedure of this embodiment is basically the same as that of FIG. 16. Here, the number of classes of input data to be subjected to dimension reduction is 2 or more and a plurality of data has labels of the classes assigned thereto. Furthermore, d feature values (d≥2) are extracted from the data, and each data is represented by the d feature values.

The number of dimensions of input data is denoted by d. When the total number of dimension reduction target data is denoted by n and the number of all classes for classification is denoted by L, the number of elements for each class is denoted by $n_l$ (l={1, 2, 3, . . . , L}. In this case, when a process of determining data to be embedded in a neighborhood region after the dimension reduction is performed by the k-nearest neighbor algorithm, the neighborhood number k is represented as "{k}={$k_1, k_2, k_3, \ldots, k_l, \ldots, k_L$}". When the data to be embedded in a neighborhood region is determined using a hypersphere of a size ε, the size is represented as "{ε}={$\varepsilon_1, \varepsilon_2, \varepsilon_3, \ldots, \varepsilon_l, \ldots, \varepsilon_L$}".

First, a process from step S1601 to step S1602 is the same as that of the fourth embodiment. Specifically, an appropriate initial value is assigned to the parameter {k} or {ε} (for example, {k}={1, 1, 1, . . . , 1} and ε=distance to a nearest point). In step S1603, a neighborhood data determination unit 103 obtains the parameter {k} or {ε}. As a concrete method, the initial value is increased and a parameter $k_l$ or $\varepsilon_l$ is obtained for each class such that a rate of data of a different class of a different label is minimized and becomes a value as large as possible. Here, in the neighborhood data set by the parameter $k_l$ or $\varepsilon_l$ set for data of a class l, the total number of data having different labels is denoted by $F_l(k_l)$ or $F_l(\varepsilon_l)$. In this case, when the neighborhood data is determined by the k-nearest neighbor algorithm, Expression (6) below may be used as a method for determining the parameter $k_l$. Note that the parameter $\varepsilon_l$ may be obtained by the same method when neighborhood data is obtained using a hypersphere having a size ε.

$$k_l = \arg\min_{k \in N}\left(\frac{F_l(k) + 1}{k \times n_l}\right) \quad (6)$$

As described above, in step S1603, the neighborhood data determination unit 103 obtains the parameters {k} or {ε} of all the classes in the feature space. Subsequently, a process in step S1604 is performed in the same procedure as the fourth embodiment. In this way, the dimension reduction may be performed.

Furthermore, as with the case of the fourth embodiment, a result of the dimension reduction may be obtained in accordance with the processing procedure of FIG. 17. Specifically, the neighborhood relationships are determined and updated in step S1701 in a $p_0$-dimensional feature space obtained by performing dimension reduction using a parameter {k} or {ε} in step S1604. Specifically, the parameter {k}$_{(1)}$ or {ε}$_{(1)}$ is determined in accordance with the procedure illustrated in FIG. 18. In this case, the method described above is employed in the p$_0$-dimensional space after the dimension reduction. This process is repeatedly performed until neighborhood data of all target data may not be finally updated. In this way, the different parameters k or ε for different classes are obtained and data which has been subjected to the dimension reduction may be obtained.

Sixth Embodiment

Hereinafter, a sixth embodiment of the disclosure will be described in detail with reference to the accompanying drawings. As with the fifth embodiment, different parameters k or ε are set in different classes, and data in the same class share the same parameter k or ε. Note that a configuration of an information processing apparatus according to this embodiment is the same as that of FIG. 1, and therefore, a description thereof is omitted.

In the fifth embodiment, the parameter k or ε is obtained from input dimension reduction target data. On the other hand, a user may recognize trend of a degree of concentration or dispersion of data in each class in addition to label information as a property of data to be subjected to classification. Therefore, in this embodiment, a method for obtaining a result of dimension reduction using the trend of concentration or dispersion of the data in each class when a d-dimensional feature is extracted from dimension reduction target data and dimension reduction is performed will be described. As an amount of correct information associated with data input in advance is larger, another result of the dimension reduction may be obtained. Accordingly, the parameter k or ε which determines neighborhood data is not determined only using input data in this embodiment but is determined by being externally supplied using other information.

Figure 19:
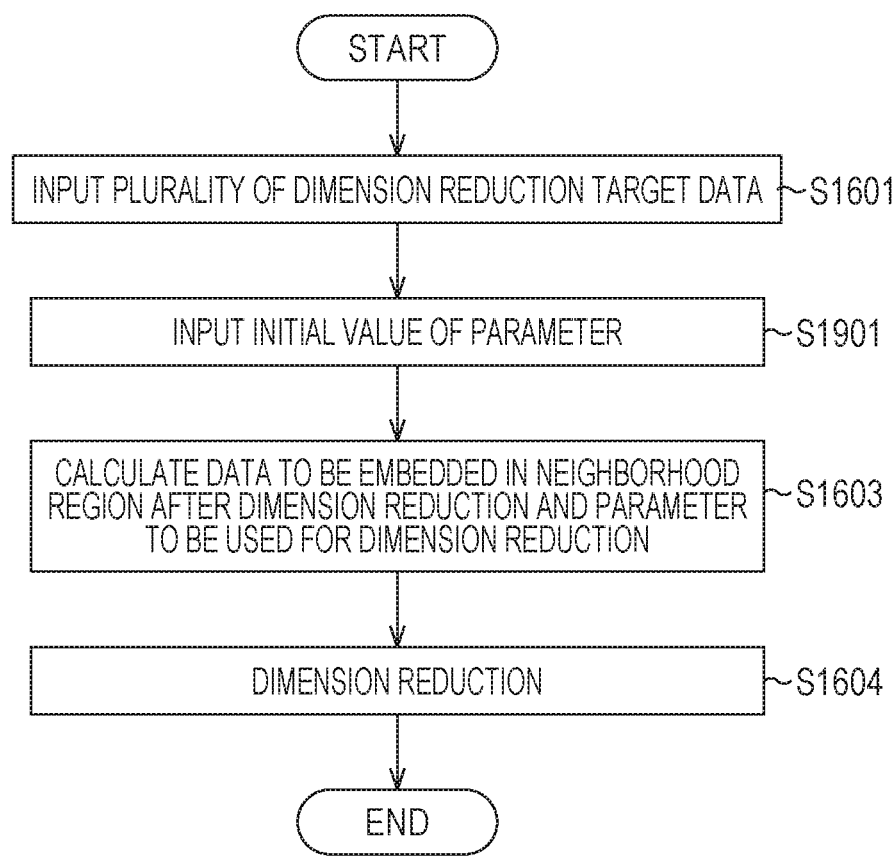
FIG. 19 is a flowchart of an example of a procedure of a process performed by an information processing apparatus according to a sixth embodiment.

FIG. 19 is a flowchart of an example of a procedure of a process according to this embodiment.

Note that, for simplicity of description, the total number L of classification target classes is 2 in a description below. Furthermore, a d-dimensional feature is extracted from an image obtained by capturing a front face of a person by an arbitrary feature extraction method in a first class. A d-dimensional feature is extracted from a general background image by the feature extraction method described above in a second class. In FIG. 19, processes in step S1601, step S1603, and step S1604 are the same as those in FIG. 16, and therefore, descriptions thereof are omitted.

First, it is assumed that the user desires that data in the first class is concentrated in a considerably small space and data in the second class disperses in a large area. In this case, by inputting information associated with a difference of distribution, dimension reduction may be performed taking a feature for separating the two classes from each other in terms of an original d-dimension feature value into consideration, and in addition, the dimension reduction may be performed while trend of a degree of concentration or dispersion of each class is reflected.

Therefore, in step S1901, an inter-data distance calculation unit 108 normalizes a feature dimension of all the data. Specifically, dispersion of the target data is 1 in all feature values. Thereafter, distances between all the data are obtained. Then a neighborhood data determination unit 103 inputs an initial value of the parameter k or ε using an input device 102 operated by the user in addition to information on a dimension reduction method, a neighborhood data determination rule, and a neighborhood embedding weight determination rule. When neighborhood data is determined using the k-nearest neighbor algorithm, for example, {k}={k$_1$, k$_2$}={100, 0} is set as an initial value of the parameter k using the input device 102 operated by the user. Note that n$_1$ is equal to or larger than 100.

The parameter k or ε is determined based on the initial value in step S1603, and dimension reduction is performed in step S1604.

Furthermore, when the neighborhood relationships are to be further corrected, a procedure illustrated in FIG. 20 is performed. In FIG. 20, the process in step S1901 described above is performed and the process in step S1701 of FIG. 17 is performed so that a result of the dimension reduction may be obtained.

Although the user inputs the initial value of the parameter k or ε in this embodiment, the initial value of the parameter k or ε may be determined using dispersion values of data in the individual classes obtained from another experiment. Alternatively, the dimension reduction may be performed by setting a small parameter {k} or {ε} when a target included in a classification target class belongs to a deep layer with reference to a layer structure of WordNet and setting a large parameter {k} or {ε} in a case of an upper layer.

Other Embodiments

The aspect of the embodiments may be realized by a process of supplying a program which realizes at least one function according to the foregoing embodiments to a system or an apparatus through a network or a storage medium and reading the program using at least one processor included in a computer of the system or the apparatus. Furthermore, the aspect of the embodiments may be realized by a circuit which realizes at least one function (an application specific integrated circuit (ASIC), for example).

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-215470 filed Nov. 2, 2016, which is hereby incorporated by reference herein in its entirety.

What is claimed is:

1. An apparatus which performs dimension reduction of a plurality of high dimensional data each representing a plurality of image features extracted from images, the apparatus comprising:
one or more processors; and
one or more memories coupled to the one or more processors, the memories stored thereon instructions which, when executed by the one or more processors, cause the apparatus to:
calculate a distance between each pair of high dimensional data in the plurality of high dimensional data;
determine a plurality of parameters each of which determines neighborhood data for respective one of the plurality of high dimensional data based on data distribution with respect to each of the plurality of high dimensional data using the calculated distance between each pair of the plurality of high dimensional data;
perform dimension reduction on the plurality of high dimensional data while keeping the neighborhood data for each of the plurality of high dimensional data in a neighborhood based on respective determined parameters;
input information on a distance relationship of at least part of data to be subjected to the dimension reduction;
re-calculate a parameter which determines the neighborhood data based on the input information; and
perform the dimension reduction on the data to be subjected to the dimension reduction based on the re-calculated parameter.

2. The apparatus according to claim 1,
wherein different types of data to be subjected to the dimension reduction have different labels, and
wherein the instruction further cause the apparatus to determine the parameter which determines the neighborhood data based on distribution of data having a same label for each data to be subjected to the dimension reduction.

3. The apparatus according to claim 2, wherein the instruction further cause the apparatus to determine the parameter which determines the neighborhood data such that a same parameter is shared by data having the same label based on the distribution of the data having the same label.

4. The apparatus according to claim 3, wherein the instructions further cause the apparatus to:
input an initial value of the parameter which determines the neighborhood data, and
determine the parameter which determines the neighborhood data by searching for the parameter from the initial value.

5. The apparatus according to claim 1 wherein the instructions further cause the apparatus to update the neighborhood data by calculating the parameter which determines the neighborhood data for each data to be subjected to the dimension reduction.

6. The apparatus according to claim 1, wherein the parameter which determines the neighborhood data is a neighborhood number of a k-nearest neighbor algorithm or a size of a hypersphere.

7. A method for performing dimension reduction of a plurality of high dimensional data each representing a plurality of image features extracted from images, the method comprising:
calculating a distance between each pair of high dimensional data in the plurality of high dimensional data;
determining a plurality of parameters each of which determines neighborhood data for respective one of the plurality of high dimensional data based on data distribution with respect to each of the plurality of high dimensional data using the calculated distance between each pair of the plurality of high dimensional data;
performing dimension reduction on the plurality of high dimensional data while keeping the neighborhood data for each of the plurality of high dimensional data in a neighborhood based on respective determined parameters;
inputting information on a distance relationship of at least part of data to be subjected to the dimension reduction;
re-calculating a parameter which determines the neighborhood data based on the input information; and
performing the dimension reduction on the data to be subjected to the dimension reduction based on the re-calculated parameter.

8. The method according to claim 7,
wherein different types of data to be subjected to the dimension reduction have different labels, and
determining determines the parameter which determines the neighborhood data based on distribution of data having a same label for each data to be subjected to the dimension reduction.

9. The method according to claim 8, wherein the determining determines the parameter which determines the neighborhood data such that a same parameter is shared by data having the same label based on the distribution of the data having the same label.

10. The method according to claim 9, further comprising:
inputting an initial value of the parameter which determines the neighborhood data,
wherein the determining determines the parameter which determines the neighborhood data by searching for the parameter from the initial value.

11. The method according to claim 7 wherein the determining updates the neighborhood data by calculating the parameter which determines the neighborhood data for each data to be subjected to the dimension reduction.

12. The method according to claim 7, wherein the parameter which determines the neighborhood data is a neighborhood number of a k-nearest neighbor algorithm or a size of a hypersphere.

13. A non-transitory storage medium storing a program which controls an information processing apparatus which performs dimension reduction of a plurality of high dimensional data each representing a plurality of image features extracted from images, the program causing a computer to execute:
calculating a distance between each pair of high dimensional data in the plurality of high dimensional data;
determining a plurality of parameters each of which determines neighborhood data for respective one of the plurality of high dimensional data based on data distribution with respect to each of the plurality of high dimensional data using the calculated distance between each pair of the plurality of high dimensional data;
performing dimension reduction on the plurality of high dimensional data while keeping the neighborhood data for each of the plurality of high dimensional data in a neighborhood based on respective determined parameters;

inputting information on a distance relationship of at least part of data to be subjected to the dimension reduction;

re-calculating a parameter which determines the neighborhood data based on the input information; and performing the dimension reduction on the data to be subjected to the dimension reduction based on the re-calculated parameter.

14. The non-transitory storage medium according to claim 13, wherein different types of data to be subjected to the dimension reduction have different labels, and determining determines the parameter which determines the neighborhood data based on distribution of data having a same label for each data to be subjected to the dimension reduction.

15. The non-transitory storage medium according to claim 14, wherein the determining determines the parameter which determines the neighborhood data such that a same parameter is shared by data having the same label based on the distribution of the data having the same label.

16. The non-transitory storage medium according to claim 13 wherein the determining updates the neighborhood data by calculating the parameter which determines the neighborhood data for each data to be subjected to the dimension reduction.

17. The non-transitory storage medium according to claim 13, wherein the parameter which determines the neighborhood data is a neighborhood number of a k-nearest neighbor algorithm or a size of a hypersphere.

* * * * *